United States Patent
Masuda et al.

(10) Patent No.: US 10,512,980 B2
(45) Date of Patent: Dec. 24, 2019

(54) WIRE ELECTRICAL DISCHARGE MACHINING SYSTEM AND RELATIVE POSITIONAL RELATIONSHIP CALCULATING METHOD

(71) Applicant: FANUC CORPORATION, Yamanashi (JP)

(72) Inventors: Masashi Masuda, Yamanashi-ken (JP); Akiyoshi Kawahara, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/010,938

(22) Filed: Jun. 18, 2018

(65) Prior Publication Data
US 2018/0369943 A1 Dec. 27, 2018

(30) Foreign Application Priority Data
Jun. 21, 2017 (JP) ................................. 2017-120969

(51) Int. Cl.
*B23H 7/20* (2006.01)
*B25J 9/16* (2006.01)
(Continued)

(52) U.S. Cl.
CPC .............. *B23H 7/20* (2013.01); *B23H 7/065* (2013.01); *B23H 7/26* (2013.01); *B25J 9/1692* (2013.01);
(Continued)

(58) Field of Classification Search
CPC . B23H 7/20; B23H 7/065; B23H 7/26; B23H 2500/20; G05B 19/41825; B25J 9/1692
See application file for complete search history.

(56) References Cited

U.S. PATENT DOCUMENTS

2008/0201010 A1* 8/2008 Takagi ................ B23H 7/065
700/180
2015/0367441 A1* 12/2015 Kaneko ................ B23K 11/06
219/83
(Continued)

FOREIGN PATENT DOCUMENTS

CN 102371409 B 11/2014
EP 1657016 A2 5/2006
(Continued)

OTHER PUBLICATIONS

English Machine Translation for Japanese Publication No. 63-151224 U, published Oct. 5, 1988, 3 pgs.
(Continued)

*Primary Examiner* — Ziaul Karim
(74) *Attorney, Agent, or Firm* — Fredrikson & Byron, P.A.

(57) ABSTRACT

A wire electrical discharge machining system includes: an electrode motion control unit for moving a wire electrode while keeping the wire electrode parallel to $Z_1$-axis and bring the wire electrode into contact with a reference piece, and moving the wire electrode while keeping the wire electrode inclined with respect to the $Z_1$-axis and bring the wire electrode into contact with the reference piece; an electrode position acquiring unit for acquiring a position of the wire electrode in an $X_1Y_1Z_1$ orthogonal coordinate system when the wire electrode touches the reference piece; a piece position acquiring unit for acquiring a piece position of the reference piece in an $X_2Y_2Z_2$ orthogonal coordinate system when the wire electrode touches the reference piece; and a relative positional relationship calculator for calculating a coordinate system relative positional relationship, based on the acquired positions.

10 Claims, 12 Drawing Sheets

(51) Int. Cl.
*G05B 19/418* (2006.01)
*B23H 7/06* (2006.01)
*B23H 7/26* (2006.01)

(52) U.S. Cl.
CPC .... *G05B 19/41825* (2013.01); *B23H 2500/20* (2013.01)

(56) References Cited

U.S. PATENT DOCUMENTS

| | | | |
|---|---|---|---|
| 2016/0151915 A1 | 6/2016 | Nishi et al. | |
| 2016/0349741 A1* | 12/2016 | Takahashi | G05B 19/41825 |

FOREIGN PATENT DOCUMENTS

| | | | |
|---|---|---|---|
| JP | 58181520 | A | 10/1983 |
| JP | 61008224 | A | 1/1986 |
| JP | 62208826 | A | 9/1987 |
| JP | 63151224 | U | 10/1988 |
| JP | 201148467 | A | 3/2011 |
| JP | 2012236257 | A | 12/2012 |
| JP | 2016221622 | A | 12/2016 |
| TW | 201424894 | A | 7/2014 |
| TW | I501827 | B | 10/2015 |

OTHER PUBLICATIONS

English Abstract and Machine Translation for Japanese Publication No. 61-008224 A, published Jan. 14, 1986, 21 pgs.
English Abstract and Machine Translation for Japanese Publication No. 58-181520 A, published Oct. 24, 1983, 6 pgs.
English Abstract for Japanese Publication No. 2016221622 A, published Dec. 28, 2016, 2 pgs.
English Abstract and Machine Translation for Japanese Publication No. 2011-048467 A, published Mar. 10, 2011, 9 pgs.
Extended European Search Report dated Nov. 26, 2018 for related EP Application No. 18178471.1, 7 pgs.
English Abstract and Machine Translation for Japanese Publication No. 2012-236257 A, published Dec. 6, 2012, 10 pgs.
English Abstract and Machine Translation for Japanese Publication No. 62-208826 A, published Sep. 14, 1987, 6 pgs.
English Abstract and Machine Translation of Taiwanese Publication No. 201424894 A, published Jul. 1, 2014, 7 pgs.
English Abstract and Machine Translation of Chinese Publication No. 102371409 B, published Nov. 5, 2014, 8 pgs.
English Abstract and Machine Translation of Taiwanese Publication No. I501827 B, published Oct. 1, 2015, 9 pgs.

* cited by examiner

WIRE ELECTRICAL DISCHARGE MACHINING SYSTEM AND RELATIVE POSITIONAL RELATIONSHIP CALCULATING METHOD

CROSS-REFERENCE TO RELATED APPLICATION

This application is based upon and claims the benefit of priority from Japanese Patent Application No. 2017-120969 filed on Jun. 21, 2017, the contents of which are incorporated herein by reference.

BACKGROUND OF THE INVENTION

Field of the Invention

The present invention relates to a wire electrical discharge machining system and a relative positional relationship calculating method for calculating a coordinate system relative positional relationship between an orthogonal coordinate system defined for a wire electrical discharge machine and an orthogonal coordinate system defined for a moving device for moving a workpiece in order to exchange workpieces in a wire electrical discharge machine.

Description of the Related Art

Japanese Laid-Open Patent Publication No. 2016-221622 discloses a system in which the relative positional relationship between a machine tool and a robot is calculated using an imaging device. Japanese Laid-Open Patent Publication No. 2011-048467 discloses a system in which the relative positional relationship between a machine tool and a robot is calculated by moving a hand of the robot to touch the hand to a probe that is attached to the tool post of the machine tool in place of a tool.

SUMMARY OF THE INVENTION

Generally, the wire electrical discharge machine or the like has a contact position detecting function for detecting the position of contact between the wire electrode and an object by bringing the wire into contact with the object. Therefore, if this contact position detecting function is effectively utilized, there is no need to provide an imaging device, a probe or the like. However, since the wire electrode extends in the Z-direction, it is possible to detect the contact position between the wire electrode and the object on the XY-plane that intersects the Z-direction, but it is not possible to detect the position in the Z-direction. For this reason, it is difficult to calculate the relative positional relationship between the coordinate system of the wire electrical discharge machine and the coordinate system of the moving device.

It is therefore an object of the present invention to provide a wire electrical discharge machining system and a method for enabling calculation of the coordinate system relative positional relationship between the coordinate system of a wire electrical discharge machine and the coordinate system of a moving device for moving a workpiece to be processed by a wire electrical discharge machine, without using an imaging device, a probe or the like.

A first aspect of the present invention resides in a wire electrical discharge machining system including: a wire electrical discharge machine configured to perform electrical discharge machining on a workpiece while feeding a wire electrode and changing a relative position between the wire electrode and a table supporting the workpiece, and also configured to operate on the basis of a preset $X_1Y_1Z_1$ orthogonal coordinate system; a moving device configured to move the workpiece in order to exchange the workpiece placed on the wire electrical discharge machine, and also configured to operate on the basis of a preset $X_2Y_2Z_2$ orthogonal coordinate system; wherein the moving device includes a reference piece having a predetermined shape and configured to serve as a reference for positional information, and a piece driving mechanism configured to move the reference piece, and the wire electrical discharge machine includes an electrode driving mechanism configured to move the wire electrode along a plane parallel to the $X_1Y_1$-plane with which a feed direction of the wire electrode intersects, and tilt the wire electrode with respect to $Z_1$-axis, and a contact detector configured to detect whether the reference piece has come in contact with the wire electrode, the wire electrical discharge machining system further including an electrode motion control unit configured to control the electrode driving mechanism so as to move the wire electrode while keeping the wire electrode parallel to the $Z_1$-axis and bring the wire electrode into contact with the reference piece and so as to move the wire electrode while keeping the wire electrode inclined with respect to the $Z_1$-axis and bring the wire electrode into contact with the reference piece; an electrode position acquiring unit configured to acquire a first electrode position of the wire electrode in the $X_1Y_1Z_1$ orthogonal coordinate system when the wire electrode in a state of being parallel to the $Z_1$-axis comes in contact with the reference piece, and a second electrode position of the wire electrode in the $X_1Y_1Z_1$ orthogonal coordinate system when the wire electrode in a state of being inclined with respect to the $Z_1$-axis comes in contact with the reference piece; a piece position acquiring unit configured to acquire the piece position of the reference piece in the $X_2Y_2Z_2$ orthogonal coordinate system when the wire electrode comes in contact with the reference piece; and a relative positional relationship calculator configured to calculate a coordinate system relative positional relationship between the $X_1Y_1Z_1$ orthogonal coordinate system and the $X_2Y_2Z_2$ orthogonal coordinate system, based on the first electrode position, the second electrode position, and the piece position.

A second aspect of the present invention resides in a relative positional relationship calculating method for calculating a coordinate system relative positional relationship between an $X_1Y_1Z_1$ orthogonal coordinate system preset in a wire electrical discharge machine and an $X_2Y_2Z_2$ orthogonal coordinate system preset in a moving device, wherein: the moving device moves a workpiece in order to exchange the workpiece placed on the wire electrical discharge machine, and operates on the basis of the preset $X_2Y_2Z_2$ orthogonal coordinate system, the moving device includes a reference piece having a predetermined shape and serving as a reference for positional information and a piece driving mechanism configured to move the reference piece; and the wire electrical discharge machine performs electrical discharge machining on the workpiece while feeding a wire electrode and changing the relative position between the wire electrode and a table supporting the workpiece, and operates on the basis of the preset $X_1Y_1Z_1$ orthogonal coordinate system, and the wire electrical discharge machine includes an electrode driving mechanism configured to move the wire electrode along a plane parallel to the $X_1Y_1$-plane with which a feed direction of the wire electrode intersects, and tilt the wire electrode with respect to $Z_1$-axis, and a contact detector configured to detect whether the reference piece has come in contact with the wire electrode, the relative positional relationship calculating method including: an electrode motion controlling step of controlling the electrode driving mechanism so as to move the wire electrode while keeping the wire electrode parallel to the $Z_1$-axis and bring the wire electrode into contact with the reference piece and so as to move the wire electrode while keeping the wire electrode inclined with respect to the $Z_1$-axis and bring the wire electrode into contact with the reference piece; an electrode position acquiring step of acquiring a first electrode position of the wire electrode in the $X_1Y_1Z_1$ orthogonal coordinate system when the wire electrode in a state of being parallel to the $Z_1$-axis comes in contact with the reference piece, and a second electrode position of the wire electrode in the $X_1Y_1Z_1$ orthogonal coordinate system when the wire electrode in a state of being inclined with respect to the $Z_1$-axis comes in contact with the reference piece; a piece position acquiring step of acquiring the piece position of the reference piece in the $X_2Y_2Z_2$ orthogonal coordinate system when the wire electrode comes in contact with the reference piece; and a relative positional relationship calculating step of calculating the coordinate system relative positional relationship between the $X_1Y_1Z_1$ orthogonal coordinate system and the $X_2Y_2Z_2$ orthogonal coordinate system, based on the first electrode position, the second electrode position, and the piece position.

According to the present invention, it is possible to calculate the relative positional relationship between the coordinate system of the wire electrical discharge machine and the coordinate system of the moving device for moving the workpiece of the wire electrical discharge machine without using an imaging device, a probe or the like. In addition, since none of imaging devices, probes and the like is used, the cost of the wire electrical discharge machining system can be reduced.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Now, a wire electrical discharge machining system and a relative positional relationship calculating method according to the present invention will be detailed hereinbelow by describing preferred embodiments with reference to the accompanying drawings.

Figure 1:
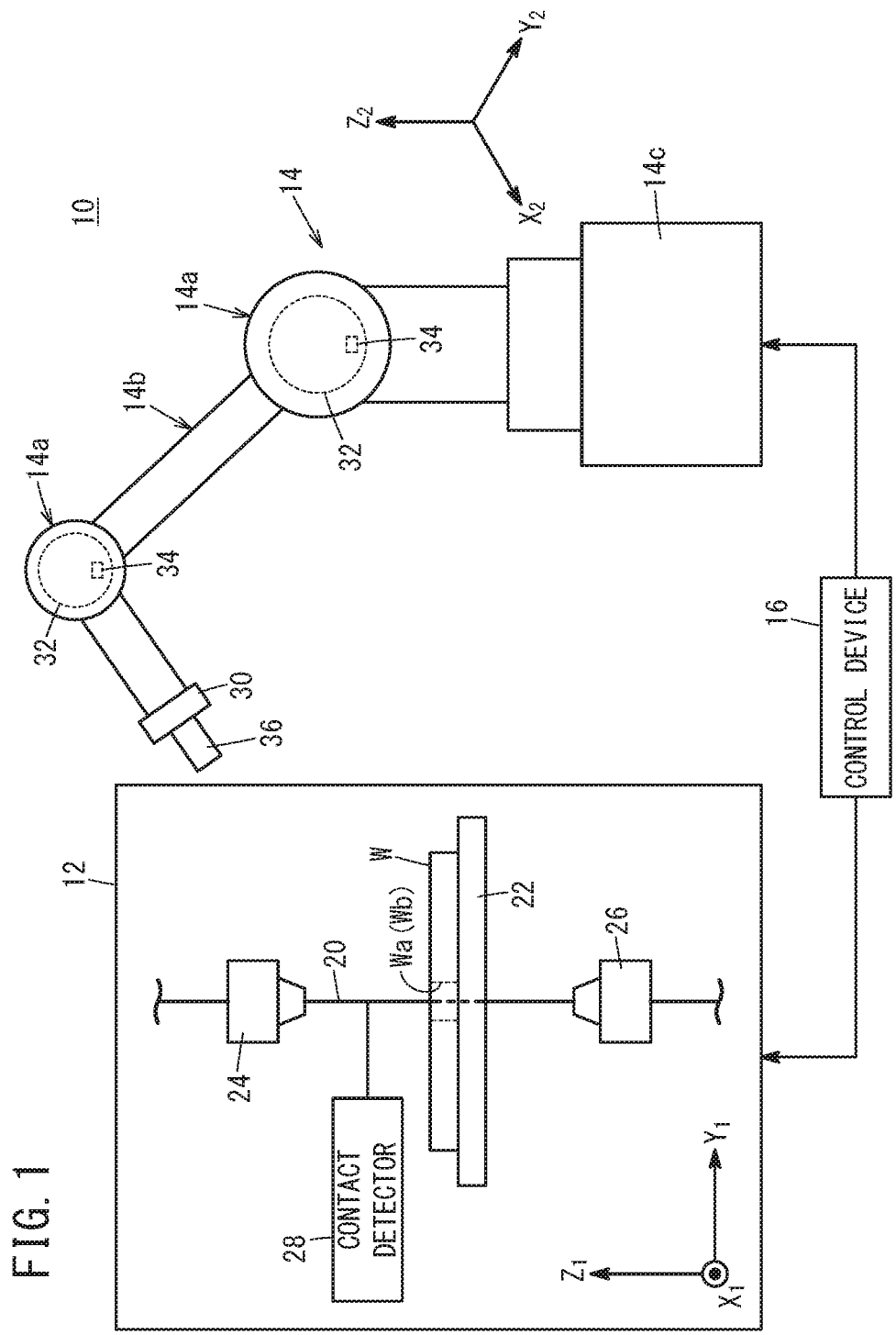
FIG. 1 is an overall configuration diagram of a wire electrical discharge machining system according to an embodiment of the present invention.

FIG. 1 is an overall configuration diagram of a wire electrical discharge machining system 10. The wire electrical discharge machining system 10 includes a wire electrical discharge machine 12, a robot 14, and a control device 16. The wire electrical discharge machine 12 operates on the basis of a preset $X_1Y_1Z_1$ orthogonal coordinate system, whereas the robot 14 operates on the basis of a preset $X_2Y_2Z_2$ orthogonal coordinate system.

The wire electrical discharge machine 12 is a machine tool that performs electrical discharge machining on a workpiece W by feeding a wire electrode 20 while moving the relative position between the wire electrode 20 and a table 22 that supports the workpiece W.

The wire electrical discharge machine 12 includes an upper wire guide 24 for supporting the wire electrode 20 above the workpiece W and a lower wire guide 26 for supporting the wire electrode 20 below the workpiece W. The wire electrode 20 is fed to the upper wire guide 24 by an unillustrated wire feed mechanism of the wire electrical discharge machine 12. Then, the wire electrode 20 fed to the upper wire guide 24 passes through a machining start hole Wa (or a machining groove Wb) of the workpiece W and the lower wire guide 26, and thereafter is collected by an unillustrated wire collecting mechanism.

The wire electrode 20 is made of, for example, a metal material such as a tungsten-based material, a copper alloy-based material or a brass-based material. On the other hand, the workpiece W is made of, for example, an iron-based material or a superhard material (e.g., tungsten carbide).

The table 22 is movable in the $X_1$-direction and the $Y_1$-direction. Therefore, the table 22 can move along a plane parallel to the $X_1Y_1$-plane. The upper wire guide 24 and the lower wire guide 26 are also movable in the $X_1$-direction and the $Y_1$-direction. Therefore, the upper wire guide 24 and the lower wire guide 26 can also move along a plane parallel to the $X_1Y_1$-plane. By changing the positions of the upper wire guide 24 and the lower wire guide 26 in the $X_1Y_1$ coordinate system, the wire electrode 20 can be tilted with respect to the $Z_1$-direction. The feed direction of the wire electrode 20 intersects with the $X_1Y_1$-plane.

The wire electrical discharge machine 12 includes a contact detector 28 that detects whether or not the wire electrode 20 has touched a member (for example, a workpiece W or the like). The contact detector 28 applies a voltage to the wire electrode 20 and detects whether or not the wire electrode 20 has come into contact with the member by checking a decrease in voltage. This is because when the wire electrode 20 touches a member, the voltage of the wire electrode 20 decreases. A detection signal detected by the contact detector 28 is sent to the control device 16.

The robot 14 is an articulated robot, and includes an arm 14b having a plurality of joints 14a and a base 14c supporting the arm 14b. An end effector such as a hand 30 is detachably attached to a distal end of the arm 14b. The hand 30 can grasp a workpiece W. The robot 14 functions as a moving device for moving or transferring the workpiece W in order to exchange the workpiece W placed on the table 22. By the robot 14, an unprocessed workpiece W is placed on the table 22, and the workpiece W after having been machined is removed from the table 22.

The arm 14b is provided with a plurality of motors 32 for moving the multiple joints 14a. These motors 32 are driven to change the posture of the arm 14b. Thus, the workpiece W etc. gripped by the hand 30 is moved. The multiple motors 32 each have an encoder 34 for detecting the rotational position of the associated motor 32. Detection signals detected by the multiple encoders 34 are sent to the control device 16.

In order to calculate the coordinate system relative positional relationship between the $X_1Y_1Z_1$ orthogonal coordinate system of the wire electrical discharge machine 12 and the $X_2Y_2Z_2$ orthogonal coordinate system of the robot 14, the hand 30 of the robot 14 grips a reference piece 36.

The reference piece 36 has a predetermined shape, and is given in the form of a rectangular parallelepiped in this embodiment. The arm 14b constitutes a piece driving mechanism for moving the reference piece 36.

The control device 16 controls the wire electrical discharge machine 12 and the robot 14. The control device 16 controls the wire electrical discharge machine 12 and the robot 14 according to a predetermined program or the like.

Figure 2:
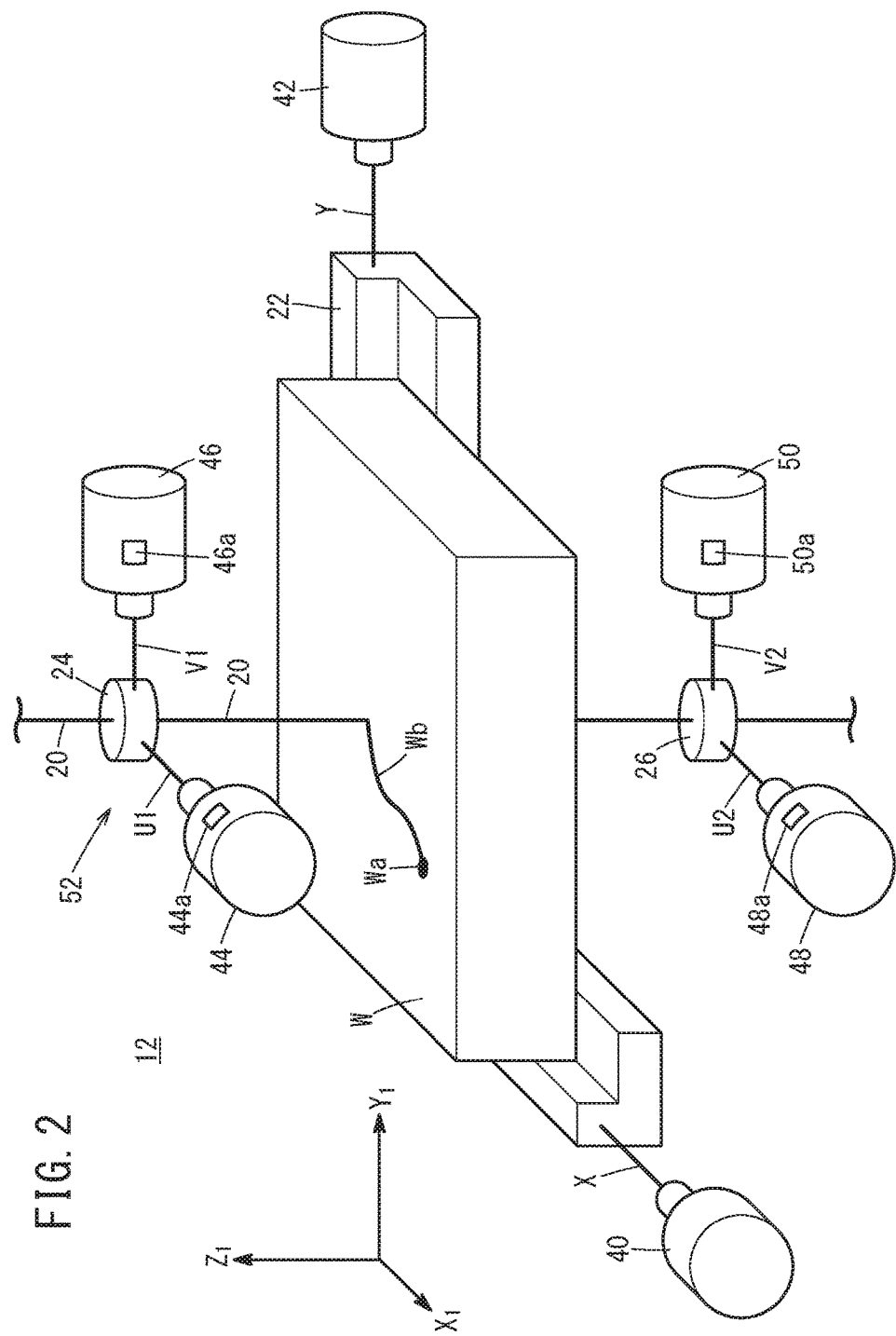
FIG. 2 is a configuration diagram of main components of the wire electrical discharge machine shown in FIG. 1.

FIG. 2 is a configuration diagram of main components of the wire electrical discharge machine 12. The wire electrical discharge machine 12 includes an X-axis drive mechanism 40 for moving the table 22 in an X-axis direction parallel to the $X_1$-axis, and a Y-axis drive mechanism 42 for moving the table 22 in a Y-axis direction parallel to the $Y_1$-axis. Although not shown, the X-axis drive mechanism 40 and the Y-axis drive mechanism 42 each have a servomotor, and a conversion and transmission mechanism for converting a rotational force of the servomotor into a rectilinear motion and transmitting it to the table 22. As a result, as the servomotors of the X-axis drive mechanism 40 and the Y-axis drive mechanism 42 are driven, the table 22 moves along a plane parallel to the $X_1Y_1$-plane.

The wire electrical discharge machine 12 includes a U1-axis drive mechanism 44 for moving the upper wire guide 24 in a U1-axis direction parallel to the $X_1$-axis, and a V1-axis drive mechanism 46 for moving the upper wire guide 24 in a V1-axis direction parallel to the $Y_1$-axis. The wire electrical discharge machine 12 also includes a U2-axis drive mechanism 48 for moving the lower wire guide 26 in a U2-axis direction parallel to the $X_1$-axis, and a V2-axis drive mechanism 50 for moving the lower wire guide 26 in a V2-axis direction parallel to the $Y_1$-axis.

Although not illustrated, the U1-axis drive mechanism 44 and the V1-axis drive mechanism 46 each have a servomotor, and a conversion and transmission mechanism for converting a rotational force of the servomotor into a linear motion and transmitting it to the upper wire guide 24. As a result, as the servomotors of the U1-axis drive mechanism 44 and the V1-axis drive mechanism 46 are driven, the upper wire guide 24 moves along a plane parallel to the $X_1Y_1$-plane.

Likewise, though not shown, the U2-axis drive mechanism 48 and the V2-axis drive mechanism 50 each have a servomotor, and a conversion and transmission mechanism for converting a rotational force of the servomotor into a linear motion and transmitting it to the lower wire guide 26. As a result, as the servomotors of the U2-axis drive mechanism 48 and the V2-axis drive mechanism 50 are driven, the lower wire guide 26 moves along a plane parallel to the $X_1Y_1$-plane.

By controlling movement of the upper wire guide 24 and the lower wire guide 26 so that the upper wire guide 24 and the lower wire guide 26 are at the same position in the $X_1Y_1$ coordinate system, the wire electrode 20 moves while being kept in parallel with the $Z_1$-axis. By setting the upper wire guide 24 and the lower wire guide 26 at mutually shifted positions in the $X_1Y_1$ coordinate system, and controlling movement of the upper and lower wire guides 24, 26 with the set relative positional relationship of the upper wire guide 24 and the lower wire guide 26 being maintained, the wire electrode 20 moves while being inclined at a certain angle with respect to the $Z_1$-direction.

The servomotors of the U1-axis drive mechanism 44, the V1-axis drive mechanism 46, the U2-axis drive mechanism 48 and the V2-axis drive mechanism 50 have respective encoders 44a, 46a, 48a, 50a each for detecting the rotational position of the corresponding servomotor. The detection signals detected by the encoders 44a, 46a, 48a, 50a are sent to the control device 16. The upper wire guide 24, the lower wire guide 26, the U1-axis drive mechanism 44, the V1-axis drive mechanism 46, the U2-axis drive mechanism 48, and the V2-axis drive mechanism 50 constitute an electrode driving mechanism 52.

Figure 3:
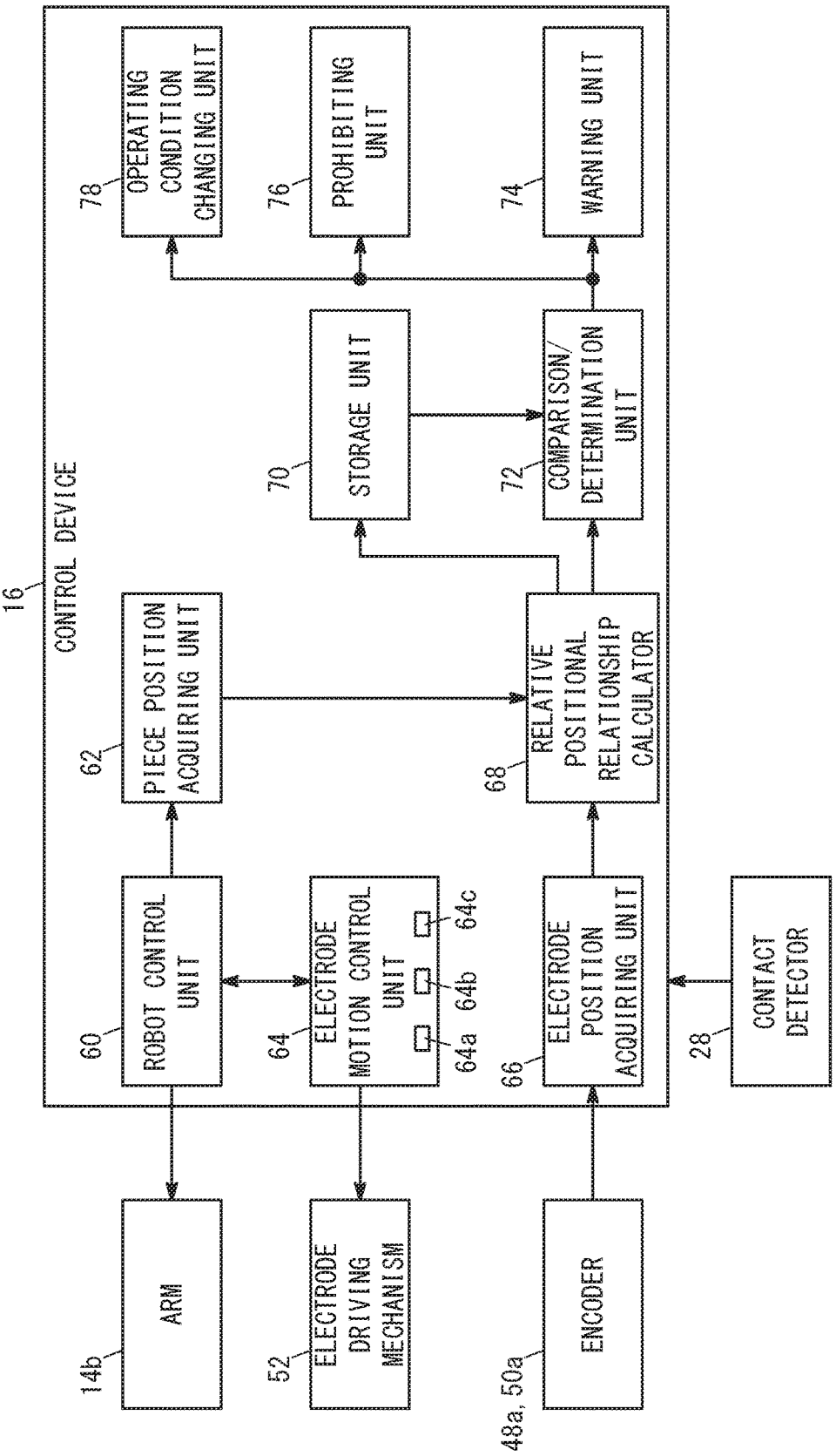
FIG. 3 is a functional block diagram showing a configuration of the control device shown in FIG. 1.

FIG. 3 is a functional block diagram showing a configuration of the control device 16. The control device 16 includes a robot control unit 60, a piece position acquiring unit 62, an electrode motion control unit 64, an electrode position acquiring unit 66, a relative positional relationship calculator 68, a storage unit 70, a comparison and determination unit 72, a warning unit 74, a prohibiting unit 76, and an operating condition changing unit 78.

The robot control unit 60 controls the multiple motors 32 to thereby control the posture of the arm 14b of the robot 14 holding the reference piece 36. The robot control unit 60 controls the multiple motors 32 so that the reference piece 36 is set at a predetermined position. The robot control unit 60 performs feedback control of the multiple motors 32 based on the signals detected by the multiple encoders 34.

The piece position acquiring unit 62 acquires the piece position of the reference piece 36 in the $X_2Y_2Z_2$ orthogonal coordinate system at the time when the reference piece 36 comes in contact with the wire electrode 20. The piece position acquiring unit 62 acquires the piece position from the robot control unit 60. This is because the robot control unit 60 controls movement of the reference piece 36 based on the $X_2Y_2Z_2$ orthogonal coordinate system, so that the robot control unit 60 grasps the piece position of the reference piece 36.

The electrode motion control unit 64 controls the electrode driving mechanism 52 (the multiple servomotors constituting the electrode driving mechanism 52) so as to move the wire electrode 20 such that the wire electrode 20 comes in contact with the reference piece 36 in a state that the wire electrode 20 is in parallel to the $Z_1$-axis. Alternatively, the electrode motion control unit 64 moves the wire electrode 20 such that the wire electrode 20 comes in contact with the reference piece 36 in a state that the wire electrode 20 is inclined with respect to the $Z_1$-axis. The robot control unit 60 performs feedback control on the electrode driving mechanism 52 (the multiple servomotors constituting the electrode driving mechanism 52) based on the detection signals from the encoders 44a, 46a, 48a and 50a.

The electrode motion control unit 64 includes a first motion control unit 64a, a second motion control unit 64b, and a third motion control unit 64c. The first motion control unit 64a controls the electrode driving mechanism 52 so as to move the wire electrode 20 while keeping the wire electrode 20 parallel to the $Z_1$-axis, and bring the wire electrode 20 into contact with the reference piece 36 that is placed at a first position in the $X_2Y_2Z_2$ orthogonal coordinate system. The second motion control unit 64b controls the electrode driving mechanism 52 so as to move the wire electrode 20 while keeping the wire electrode 20 parallel to the $Z_1$-axis, and bring the wire electrode 20 into contact with the reference piece 36 that is placed at a second position, which is different from the first position, in the $X_2Y_2Z_2$ orthogonal coordinate system. The third motion control unit 64c controls the electrode driving mechanism 52 so as to move the wire electrode 20 in an inclined state relative to the $Z_1$-axis, and bring the wire electrode 20 into contact with the reference piece 36 that is placed at a predetermined position in the $X_2Y_2Z_2$ orthogonal coordinate system.

The electrode position acquiring unit 66 acquires the electrode position of the wire electrode 20 in the $X_1Y_1Z_1$ orthogonal coordinate system when the wire electrode 20 in parallel to the $Z_1$-axis is in contact with the reference piece 36 (which may be referred to hereinbelow as the first electrode position). In the present embodiment, the position of the lower wire guide 26 is regarded as the first electrode-position of the wire electrode 20. Therefore, when the contact detector 28 detects the contact, the electrode position acquiring unit 66 acquires the position of the lower wire guide 26 in the $X_1Y_1Z_1$ orthogonal coordinate system based on the detection signals from the encoders 48a, 50a, and regards it as the position of the wire electrode 20. When the wire electrode 20 is in parallel to the $Z_1$-axis, the positions of the upper wire guide 24 and the lower wire guide 26 in the $X_1Y_1$ coordinate system are identical.

The electrode position acquiring unit 66 acquires a second electrode position of the wire electrode 20 in the $X_1Y_1Z_1$ orthogonal coordinate system when the wire electrode 20 in an inclined state relative to the $Z_1$-axis is in contact with the reference piece 36. Here, as to the first electrode position and the second electrode position acquired by the electrode position acquiring unit 66, the positional coordinate of the wire electrode 20 in the $Z_1$-direction ($Z_1$-axis) is unknown. That is, the first electrode position and the second electrode position correspond to the respective positional coordinates of the wire electrode 20 in the $X_1Y_1$ coordinate system.

Based on the first electrode position, the second electrode position and the piece position, the relative positional relationship calculator 68 calculates the coordinate system relative positional relationship between the $X_1Y_1Z_1$ orthogonal coordinate system and the $X_2Y_2Z_2$ orthogonal coordinate system.

Figure 4:
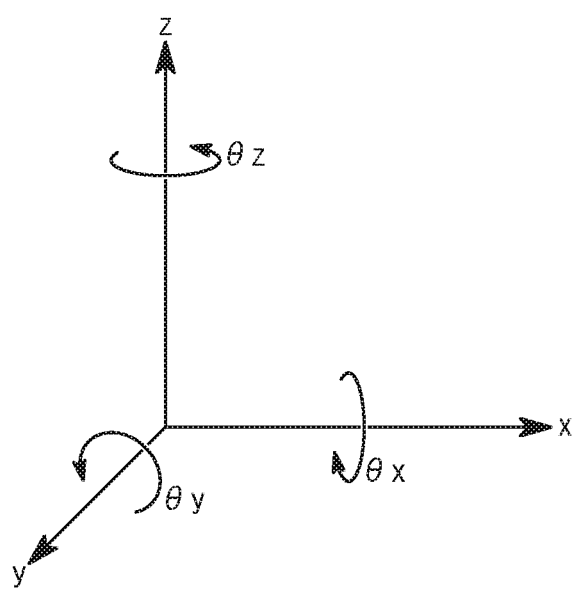
FIG. 4 is a diagram showing a relative positional relationship (x, y, z, θx, θy, θz) between an $X_1Y_1Z_1$ orthogonal coordinate system and an $X_2Y_2Z_2$ orthogonal coordinate system.

FIG. 4 is a diagram showing a coordinate system relative positional relationship between the $X_1Y_1Z_1$ orthogonal coordinate system and the $X_2Y_2Z_2$ orthogonal coordinate system. FIG. 4 shows the coordinate system relative positional relationship (x, y, z, θx, θy, θz) of the $X_2Y_2Z_2$ orthogonal coordinate system relative to the $X_1Y_1Z_1$ orthogonal coordinate system. More specifically, x indicates the translational shift amount of the $X_2Y_2Z_2$ orthogonal coordinate system in the $X_1$-axis direction, relative to the $X_1Y_1Z_1$ orthogonal coordinate system. Similarly, y represents the translational shift amount of the $X_2Y_2Z_2$ orthogonal coordinate system in the $Y_1$-axis direction, relative to the $X_1Y_1Z_1$ orthogonal coordinate system, and z represents the translational shift amount of the $X_2Y_2Z_2$ orthogonal coordinate system in the $Z_1$-axis direction, relative to the $X_1Y_1Z_1$ orthogonal coordinate system. Further, θx indicates the rotational shift amount of the $X_2Y_2Z_2$ orthogonal coordinate system about $X_1$-axis, relative to the $X_1Y_1Z_1$ orthogonal coordinate system. Likewise, θy represents the rotational shift amount of the $X_2Y_2Z_2$ orthogonal coordinate system about $Y_1$-axis, relative to the $X_1Y_1Z_1$ orthogonal coordinate system, and θz represents the rotational shift amount of the $X_2Y_2Z_2$ orthogonal coordinate system about $Z_1$-axis, relative to the $X_1Y_1Z_1$ orthogonal coordinate system. A method of calculating this coordinate system relative positional relationship (x, y, z, θx, θy, θz) will be detailed later.

In the present embodiment, it becomes possible to calculate the coordinate system relative positional relationship (x, y, z, θx, θy, θz) by bringing the wire electrode 20 into contact with the reference piece 36 while keeping the wire electrode 20 parallel to the $Z_1$-axis and by bringing the wire electrode 20 into contact with the reference piece 36 while keeping the wire electrode 20 inclined relative to the $Z_1$-direction.

The storage unit 70 stores a predetermined reference relative positional relationship between the $X_1Y_1Z_1$ orthogonal coordinate system and the $X_2Y_2Z_2$ orthogonal coordinate system. The comparison and determination unit 72 compares the coordinate system relative positional relationship calculated by the relative positional relationship calculator 68 with the reference relative positional relationship stored in the storage unit 70, and determines whether or not the difference falls within an allowable range.

When the comparison and determination unit 72 determines that the difference between the coordinate system relative positional relationship calculated by the relative positional relationship calculator 68 and the reference relative positional relationship stored in the storage unit 70 falls outside the allowable range, the warning unit 74 may warn the operator of the fact. The warning unit 74 may include a display unit such as a liquid crystal display, and warn the operator by displaying the fact on the display unit. In addition, the warning unit 74 may include a speaker or a light emitting unit to alert the operator by emitting a warning sound from the speaker or light from the light emitting unit.

When the comparison and determination unit 72 determines that the difference between the coordinate system relative positional relationship calculated by the relative positional relationship calculator 68 and the reference relative positional relationship stored in the storage unit 70 falls outside the allowable range, the prohibiting unit 76 may prohibit the wire electrical discharge machine 12 and the robot 14 from operating. Thus, driving of the wire electrical discharge machine 12 and the robot 14 is stopped.

When the comparison and determination unit 72 determines that the difference between the coordinate system relative positional relationship calculated by the relative positional relationship calculator 68 and the reference relative positional relationship stored in the storage unit 70 falls outside the allowable range, the operating condition changing unit 78 may change the operating conditions of the wire electrical discharge machine 12 and the robot 14.

When the prohibiting unit 76 prohibits the operations of the wire electrical discharge machine 12 and the robot 14, the operating condition changing unit 78 does not always have to change the operating conditions of the wire electrical discharge machine 12 and the robot 14. Conversely, when the operating condition changing unit 78 changes the operating conditions of the wire electrical discharge machine 12 and the robot 14, the prohibiting unit 76 does not always have to prohibit the operations of the wire electrical discharge machine 12 and the robot 14. Alternatively, when the comparison and determination unit 72 determines that the difference between the coordinate system relative positional relationship calculated by the relative positional relationship calculator 68 and the reference relative positional relationship stored in the storage unit 70 falls outside the allowable range, one of the warning unit 74, the prohibiting unit 76, and the operating condition changing unit 78 may perform the corresponding process.

The reason why the warning unit 74, the prohibiting unit 76 and the operating condition changing unit 78 are provided is as follows. When the shift amount between the $X_2Y_2Z_2$ orthogonal coordinate system and the $X_1Y_1Z_1$ orthogonal coordinate system is larger than expected, there is a risk that the wire electrical discharge machine 12 and the robot 14 might collide with each other when the two apparatuses come close to each other.

It should be noted that when the comparison and determination unit 72 determines that the difference between the coordinate system relative positional relationship calculated by the relative positional relationship calculator 68 and the reference relative positional relationship stored in the storage unit 70 falls outside the allowable range, the relative positional relationship calculator 68 may store the calculated coordinate system relative positional relationship in the storage unit 70. In this case, the calculated coordinate system relative positional relationship may be written over the reference relative positional relationship stored in the storage unit 70, and stored therein.

Figure 5:
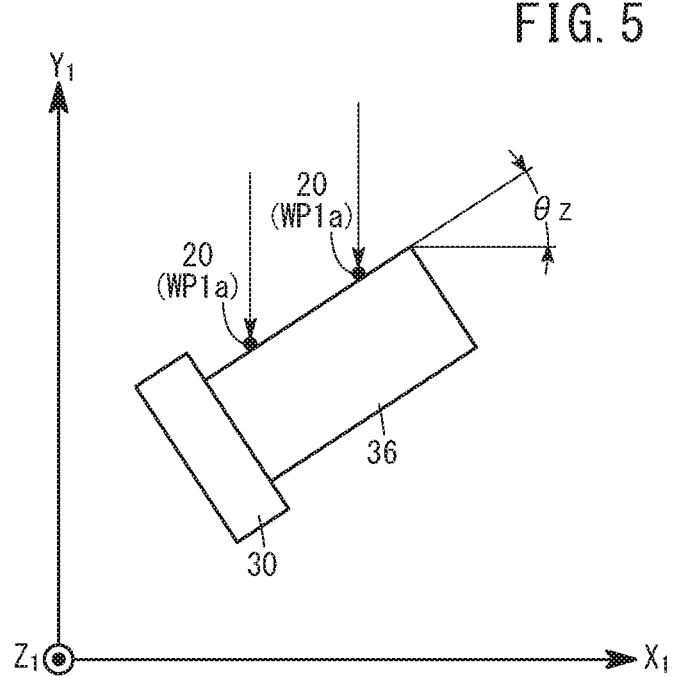
FIG. 5 is a diagram for explaining calculation of θz in the embodiment.
Figure 6:
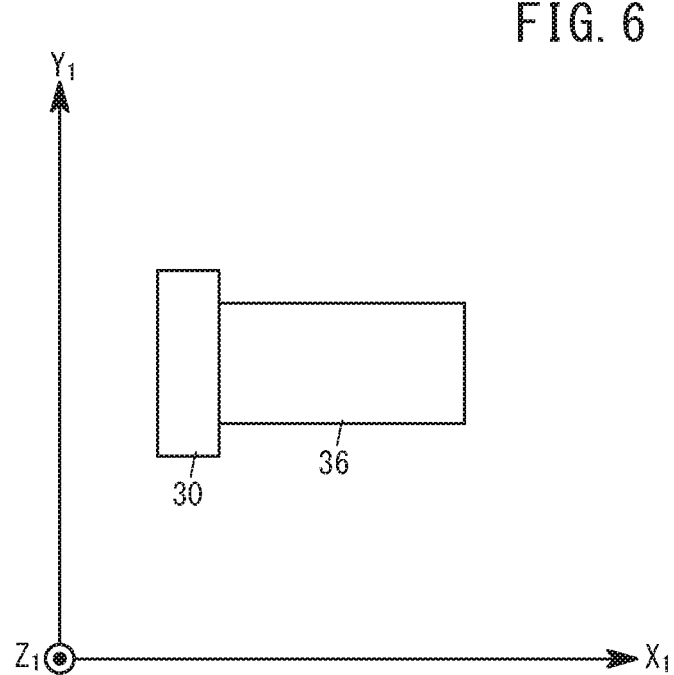
FIG. 6 is a view showing a reference piece after an $X_2Y_2Z_2$ orthogonal coordinate system has been modified by θz in the embodiment.
Figure 7:
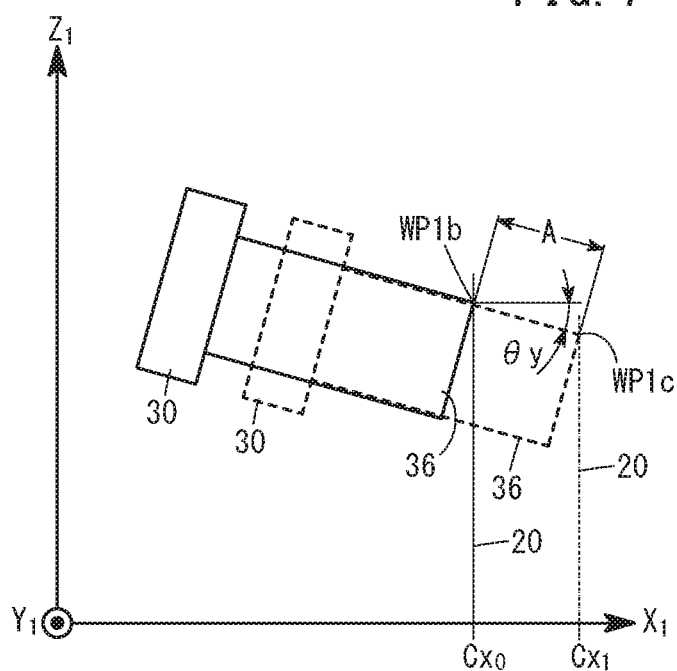
FIG. 7 is a diagram for explaining calculation of θx and θy in the embodiment.
Figure 8:
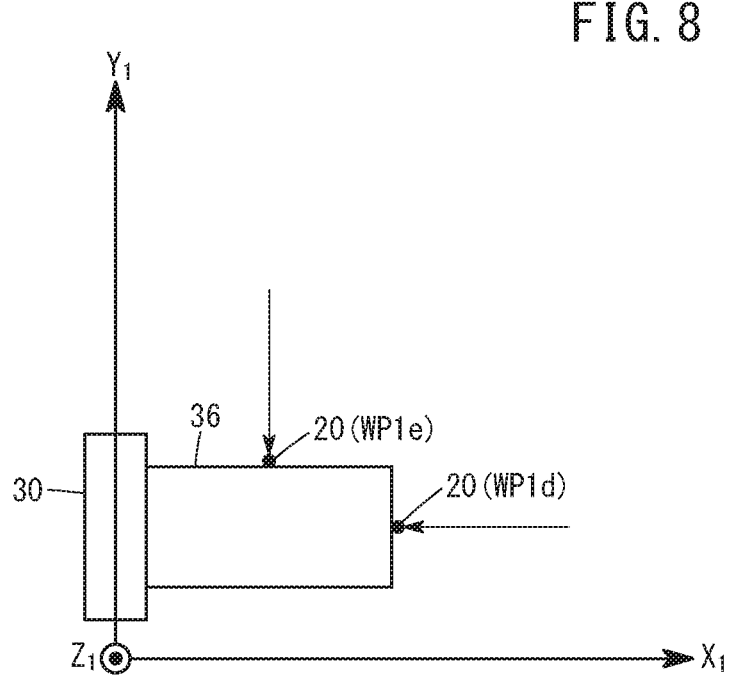
FIG. 8 is a diagram for explaining calculation of x and y in the embodiment.
Figure 9:
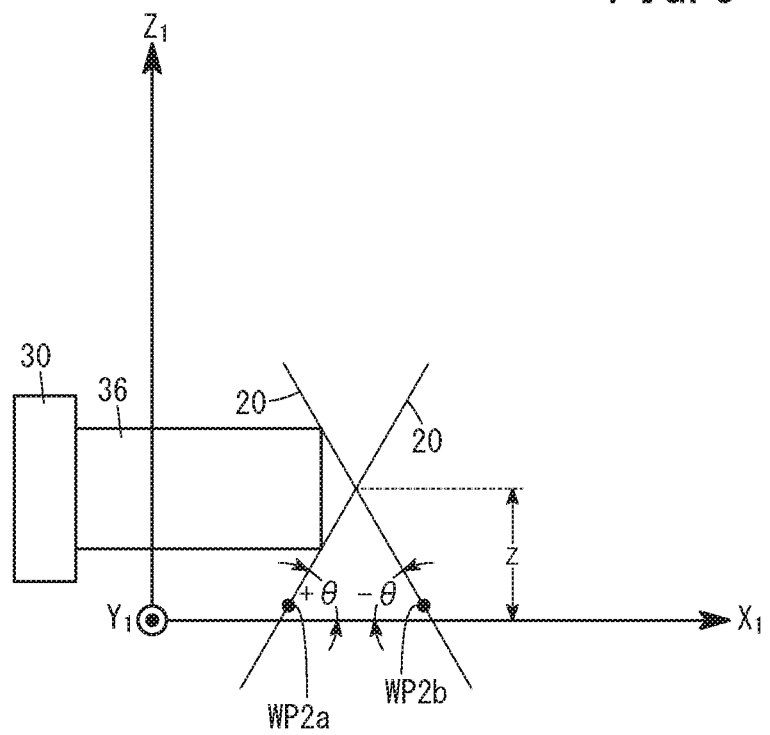
FIG. 9 is a diagram for explaining calculation of z in the embodiment.

Next, referring to FIGS. 5 to 9, description will be made on the method of calculating the coordinate system relative positional relationship (x, y, z, θx, θy, θz) when the reference piece 36 is in the form of a rectangular parallelepiped. FIG. 5 is a diagram for explaining calculation of θz; FIG. 6 is a diagram showing the reference piece 36 after the $X_2Y_2Z_2$ orthogonal coordinate system has been modified by θz; FIG. 7 is a diagram for explaining calculation of θx, θy; FIG. 8 is a diagram for explaining calculation of x and y; and FIG. 9 is a diagram for explaining calculation of z. First, the control device 16 calculates θz first, thereafter calculates θx, θy, then calculates x, y, and finally calculates z.

<Calculation of θz>

As shown in FIG. 5, the robot control unit 60 moves the reference piece 36 to an arbitrary position PP1 inside the machining area of the wire electrical discharge machine 12, in the $X_2Y_2Z_2$ orthogonal coordinate system. At that time, the robot control unit 60 moves the reference piece 36 to the position PP1 such that the amount of rotation about the $X_2$-axis, the amount of rotation about the $Y_2$-axis and the amount of rotation about the $Z_2$-axis become zero in the $X_2Y_2Z_2$ orthogonal coordinate system. Since the $X_1Y_1Z_1$ orthogonal coordinate system and the $X_2Y_2Z_2$ orthogonal coordinate system are shifted from each other, the reference piece 36 is rotated about the $Z_1$-axis by a rotational shift amount of θz in the $X_1Y_1Z_1$ orthogonal coordinate system, as shown in FIG. 5.

The piece position acquiring unit 62 acquires the piece position (that is, the position PP1) in the $X_2Y_2Z_2$ orthogonal coordinate system from the robot control unit 60. In this embodiment, the position of the center of gravity of the rectangular reference piece 36 is regarded as the piece position.

The electrode motion control unit 64 moves the wire electrode 20 in the negative $Y_1$-direction while keeping the wire electrode 20 parallel to the $Z_1$-axis so that the wire electrode 20 comes in contact with the reference piece 36 from the positive $Y_1$-axis direction side. Then, the electrode position acquiring unit 66 acquires the position WP1a (the first electrode position) of the wire electrode 20 in the $X_1Y_1Z_1$ orthogonal coordinate system when the wire electrode 20 is in contact with the reference piece 36.

Thereafter, the electrode motion control unit 64 moves the wire electrode 20 toward the positive $Y_1$-axis direction side while keeping the wire electrode 20 parallel to the $Z_1$-axis to separate the wire electrode 20 from the reference piece 36, and then move the wire electrode 20 toward the positive $X_1$-direction side or the negative $X_1$-direction side. Again, the electrode motion control unit 64 moves the wire electrode 20 in the negative $Y_1$-direction while keeping the wire electrode 20 parallel to the $Z_1$-axis so that the wire electrode 20 comes in contact with the reference piece 36 from the positive $Y_1$-direction side. Then, the electrode position acquiring unit 66 acquires the position WP1a (the first electrode position) of the wire electrode 20 in the $X_1Y_1Z_1$ orthogonal coordinate system when the wire electrode 20 is in contact with the reference piece 36.

Next, the relative positional relationship calculator 68 calculates θz from the acquired multiple positions WP1a. After calculation of θz, the robot control unit 60 moves the reference piece 36 in the compensated $X_2Y_2Z_2$ orthogonal coordinate system, compensated by the calculated θz. That is, since the $X_2Y_2Z_2$ orthogonal coordinate system is compensated by using the calculated θz, the rotational shift amount θz about the $Z_1$-axis between the $X_1Y_1Z_1$ orthogonal coordinate system and the compensated $X_2Y_2Z_2$ orthogonal coordinate system is canceled to be zero. Therefore, the reference piece 36 is set as shown in FIG. 6, so that the longitudinal-direction of the reference piece 36 is in parallel to the $X_1$-axis.

<Calculation of θx, θy>

Since the calculation methods of θx and θy are the same, description herein will be made by giving an example of the calculation method of θy.

The robot control unit 60 moves the reference piece 36 in advance to an arbitrary first position (which will be referred to hereinbelow as a position PP2) inside the machining area of the wire electrical discharge machine 12, in the compensated $X_2Y_2Z_2$ orthogonal coordinate system. In the compensated $X_2Y_2Z_2$ orthogonal coordinate system (the $X_2Y_2Z_2$ orthogonal coordinate system that has been compensated so that θz is 0), the robot control unit 60 moves the reference piece 36 to the position PP2 so that the amount of rotation about the $X_2$-axis, the amount of rotation about the $Y_2$-axis and the amount of rotation about the $Z_2$-axis become zero. The position PP2, which is the first position, may be the same as the position PP1 or may be different therefrom. The piece position acquiring unit 62 acquires the piece position (i.e., the position PP2) in the compensated $X_2Y_2Z_2$ orthogonal coordinate system from the robot control unit 60.

Next, as indicated by the solid line in FIG. 7, the electrode motion control unit 64 (the first motion control unit 64a) moves the wire electrode 20 in the negative $X_1$-direction while keeping the wire electrode 20 parallel to the $Z_1$-axis so that the wire electrode 20 comes in contact with the reference piece 36 positioned at the first position in the $X_2Y_2Z_2$ orthogonal coordinate system, from the positive $X_1$-direction side.

Subsequently, the electrode position acquiring unit 66 acquires the first electrode position of the wire electrode 20 in the $X_1Y_1Z_1$ orthogonal coordinate system (which will be referred to hereinbelow as the position WP1b) when the wire electrode 20 is in contact with the reference piece 36 located at the position PP2, i.e., the first position. The $X_1$-coordinate (i.e., the coordinate in $X_1$-axis) of the acquired position WP1b is denoted as $Cx_0$.

Next, as indicated by the broken line in FIG. 7, the robot control unit 60 moves the reference piece 36 to a position PP3 which is a second position in the compensated $X_2Y_2Z_2$ orthogonal coordinate system. This position PP3 is a position displaced from the position PP2 by a distance A in the positive $X_2$-direction. The piece position acquiring unit 62 acquires the piece position (that is, the position PP3) in the compensated $X_2Y_2Z_2$ orthogonal coordinate system from the robot control unit 60. The first position PP2 and the second position PP3 are the same, except that the $X_2$-coordinates (i.e., the coordinates in $X_2$-axis) are different.

As shown by the broken line in FIG. 7, the electrode motion control unit 64 (the second motion control unit 64b) moves the wire electrode 20 in the negative $X_1$-axis direction while keeping the wire electrode 20 parallel to the $Z_1$-axis so that the wire electrode 20 comes in contact with the reference piece 36 located at the position PP3 in the $X_2Y_2Z_2$ orthogonal coordinate system, from the positive $X_1$-direction side.

Subsequently, the electrode position acquiring unit 66 acquires the first electrode position of the wire electrode 20 in the $X_1Y_1Z_1$ orthogonal coordinate system (which will be referred to hereinbelow as the position WP1c) when the wire electrode 20 is in contact with the reference piece 36 located at the position PP3, i.e., the second position. The $X_1$-coordinate of the acquired position WP1c is denoted as $Cx_1$.

Then, the relative positional relationship calculator 68 calculates θy from the acquired $X_1$-coordinates $Cx_0$ and $Cx_1$ and the piece positions (position PP2 and position PP3). The relative positional relationship calculator 68 calculates θy using the following Equation (1). Note that A is the distance between the position PP2 (i.e., the first position) and the position PP3 (i.e., the second position).

$$\cos\theta y = \frac{Cx_1 - Cx_0}{A} \quad (1)$$
$$\therefore \theta y = \pm \cos^{-1}\left(\frac{Cx_1 - Cx_0}{A}\right)$$

Here, θy has two solutions of opposite sign (±), and at this point, it cannot be determined which one is appropriate. Accordingly, one of the two solutions is selected as θy, and the $X_2Y_2Z_2$ orthogonal coordinate system is further compensated with the selected θy. Then, the above operation is performed once again to calculate θy. If the absolute value of the newly calculated θy is smaller than the absolute value of the initially calculated θy, then the selected θy is adopted. If the absolute value of the newly calculated θy is greater than the absolute value of the initially calculated θy, then the solution which was not selected is adopted as θy. In this way, the value of θy can be determined.

The calculation of θx can be obtained in the same manner as the calculation of θy. That is, θx can be obtained based on the first electrode positions at which the wire electrode 20 and the reference piece 36 come in contact with each other, before and after movement of the reference piece 36 in the $Y_1$-axis direction, and the movement distance of the reference piece 36. In this process, the wire electrode 20 may be brought into contact with the reference piece 36 from the positive $Y_1$-direction side. In other words, the method of calculating θy may be applied in a state where the $X_1Y_1Z_1$ orthogonal coordinate system is rotated 90° about the $Z_1$-axis.

After the determination of θy and θx, the robot control unit 60 moves the reference piece 36 in the $X_2Y_2Z_2$ orthogonal coordinate system that was compensated based on θz, θy and θx. That is, by compensating the $X_2Y_2Z_2$ orthogonal coordinate system using the calculated θz, θy and θx, the rotational shift amount θz about the $Z_1$-axis, the rotational shift amount θy about the $Y_1$-axis, and the rotational shift amount θx about the $X_1$-axis between the $X_1Y_1Z_1$ orthogonal coordinate system and the compensated $X_2Y_2Z_2$ orthogonal coordinate system become zero.

<Calculation of x, y>

After θx, θy, and θz are calculated, the robot control unit 60 moves the reference piece 36 to an arbitrary position PP4 inside the machining area of the wire electrical discharge machine 12, in the compensated $X_2Y_2Z_2$ orthogonal coordinate system. At that time, the robot control unit 60 moves the reference piece 36 to the position PP4 such that the amount of rotation about the $X_2$-axis, the amount of rotation about the $Y_2$-axis, and the amount of rotation about the $Z_2$-axis become zero in the compensated $X_2Y_2Z_2$ orthogonal coordinate system. This position PP4 may be the same as the position PP3 or may be different. The piece position acquiring unit 62 acquires the piece position (that is, the position PP4) in the compensated $X_2Y_2Z_2$ orthogonal coordinate system from the robot control unit 60.

As shown in FIG. 8, the electrode motion control unit 64 moves the wire electrode 20 in the negative $X_1$-direction while keeping the wire electrode 20 parallel to the $Z_1$-axis such that the wire electrode 20 comes in contact with the reference piece 36 located at the position PP4 in the $X_2Y_2Z_2$ orthogonal coordinate system from the positive $X_1$-direction side.

Next, the electrode position acquiring unit 66 acquires a first electrode position (which will be referred to hereinbelow as a position WP1d) of the wire electrode 20 in the $X_1Y_1Z_1$ orthogonal coordinate system when the wire electrode 20 is in contact with the reference piece 36 located at the position PP4.

Then, the relative positional relationship calculator 68 calculates x based on the acquired position WP1d and the position PP4. That is, since the shape of the reference piece 36, which is a rectangular parallelepiped, is known, the position of the center of gravity of the reference piece 36 in the $X_1$-axis direction can be obtained from the position WP1d, so that x can be calculated from the obtained position of the center of gravity and the position PP4.

Further, as shown in FIG. 8, the electrode motion control unit 64 moves the wire electrode 20 in the negative $Y_1$-direction while keeping the wire electrode 20 parallel to the $Z_1$-axis such that the wire electrode 20 comes in contact with the reference piece 36 located at the position PP4 in the $X_2Y_2Z_2$ orthogonal coordinate system from the positive $Y_1$-direction side.

Next, the electrode position acquiring unit 66 acquires a first electrode position (which will be referred to hereinbelow as a position WP1e) of the wire electrode 20 in the $X_1Y_1Z_1$ orthogonal coordinate system when the wire electrode 20 is in contact with the reference piece 36 located at the position PP4.

Then, the relative positional relationship calculator 68 calculates y based on the acquired position WP1e and the position PP4. That is, since the shape of the reference piece 36, which is a rectangular parallelepiped, is known, the position of the center of gravity of the reference piece 36 in the $Y_1$-direction can be obtained from the position WP1e, so that y can be calculated from the obtained position of the center of gravity and the position PP4.

After calculation of x and y, the robot control unit 60 moves the reference piece 36 in the $X_2Y_2Z_2$ orthogonal coordinate system that has been compensated based on the calculated θz, θy, θx, x and y. That is, by compensating the $X_2Y_2Z_2$ orthogonal coordinate system using the calculated θz, θy, θx, x and y, as to the coordinate system relative positional relationship (x, y, z, θx, θy, θz) between the $X_1Y_1Z_1$ orthogonal coordinate system and the compensated $X_2Y_2Z_2$ orthogonal coordinate system, the values of θz, θy, θx, x, and y become zero.

<Calculation of z>

After θz, θy, θx, x, and y are calculated, the robot control unit 60 moves the reference piece 36 to a predetermined position PP5 inside the machining area of the wire electrical discharge machine 12, in the compensated $X_2Y_2Z_2$ orthogonal coordinate system. The robot control unit 60 moves the reference piece 36 to the position PP5 such that the amount of rotation about the $X_2$-axis, the amount of rotation about the $Y_2$-axis, and the amount of rotation about the $Z_2$-axis become zero in the compensated $X_2Y_2Z_2$ orthogonal coordinate system. This position PP5 may be the same as the position PP4 or may be different. The piece position acquiring unit 62 acquires the piece position (i.e., the position PP5) in the compensated $X_2Y_2Z_2$ orthogonal coordinate system from the robot control unit 60.

As shown in FIG. 9, the electrode motion control unit 64 (third motion control unit 64c) moves the wire electrode 20 in the negative $X_1$-axis direction while keeping the wire electrode 20 inclined a predetermined angle +θ in the $X_1$-direction with respect to the $Z_1$-axis so that the wire electrode 20 comes in contact with the reference piece 36 located at the position PP5 in the $X_2Y_2Z_2$ orthogonal coordinate system, from the positive $X_1$-direction side.

Then, the electrode position acquiring unit 66 acquires a second electrode position (which will be referred to hereinbelow as a position WP2a) of the wire electrode 20 in the $X_1Y_1Z_1$ orthogonal coordinate system when the wire electrode 20 is in contact with the reference piece 36 located at the position PP5.

Further, as shown in FIG. 9, the electrode motion control unit 64 (the third motion control unit 64c) moves the wire electrode 20 in the negative $X_1$-axis direction while keeping the wire electrode 20 inclined a predetermined angle −θ in the $X_1$-direction with respect to the $Z_1$-axis, so that the wire electrode 20 comes in contact with the reference piece 36 located at the position PP5 in the $X_2Y_2Z_2$ orthogonal coordinate system, from the positive $X_1$-direction side.

Then, the electrode position acquiring unit 66 acquires a second electrode position (which will be referred to hereinbelow as a position WP2b) of the wire electrode 20 in the $X_1Y_1Z_1$ orthogonal coordinate system when the wire electrode 20 is in contact with the reference piece 36 located at the position PP5.

The relative positional relationship calculator 68 calculates z from the acquired positions WP2a, WP2b and the angle ±θ. More specifically, z is calculated by determining the height position of an intersection point at which a line defined by the wire electrode 20 that is in contact with the reference piece 36 at the predetermined inclination angle of +θ with respect to the $Z_1$-axis intersects a line defined by the wire electrode 20 that is in contact with the reference piece 36 at the predetermined inclination angle of −θ with respect to the $Z_1$-axis. The height position of the intersection point corresponds to the position in height direction of the center of gravity of the rectangular parallelepiped reference piece 36 in the $X_1Y_1Z_1$ orthogonal coordinate system.

Thus, the relative positional relationship calculator 68 can calculate all of x, y, z, θx, θy and θz.

[Modifications]

The above embodiment may be modified as follows.

<Modification 1>

Though, in the above embodiment, description has been made using the reference piece 36 having a rectangular parallelepiped shape, an example using a reference piece 36 having a spherical shape will be described. Also in Modification 1, the wire electrical discharge machine 12 and the robot 14 have the same configuration, and the same components as those in the above embodiment are allotted with the same reference numerals. Also in Modification 1, the position of the center of gravity of the reference piece 36, i.e., the position of the center of the sphere, is regarded as the position of the reference piece 36.

Figure 10:
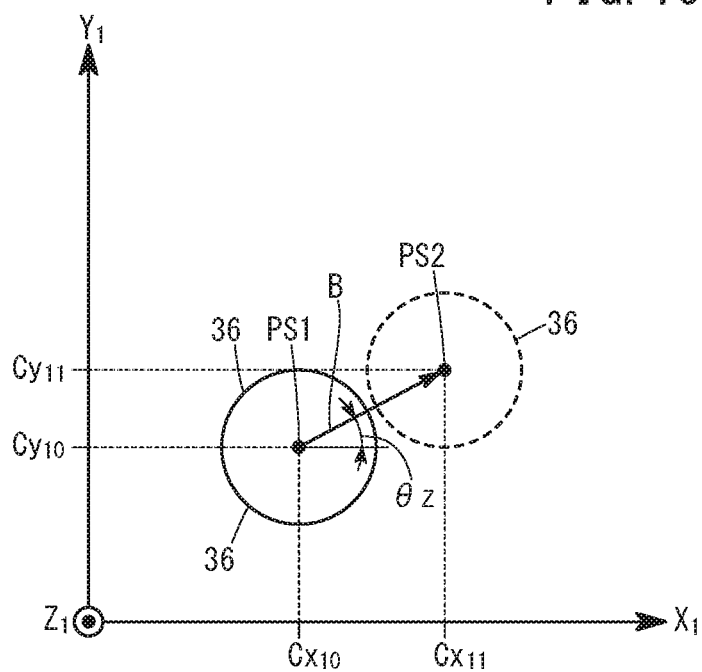
FIG. 10 is a diagram for explaining calculation of θz in Modification 1.
Figure 11:
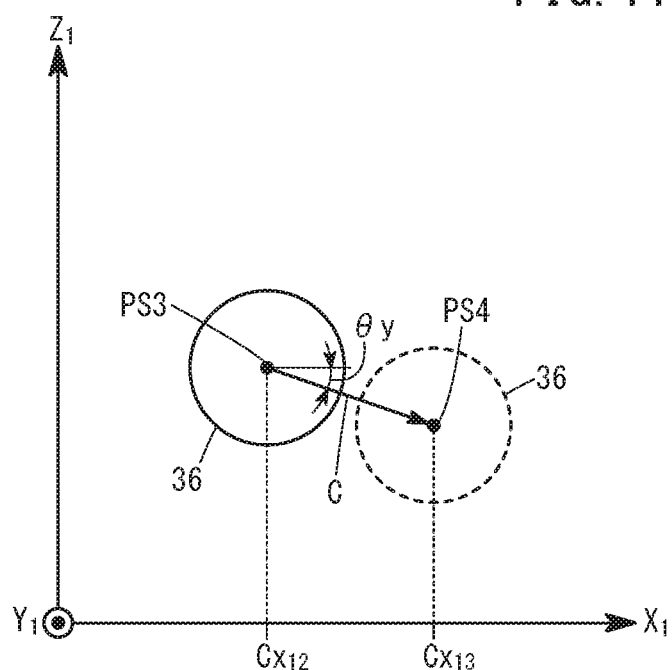
FIG. 11 is a view for explaining a method of calculating θx and θy in Modification 1.
Figure 12:
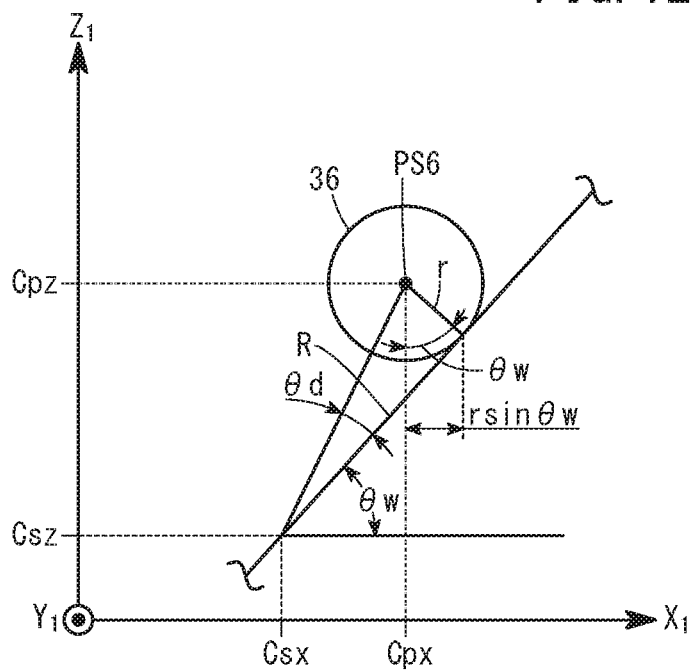
FIG. 12 is a diagram for explaining calculation of z in Modification 1.

Referring to FIGS. 10 to 12, a method of calculating a coordinate system relative positional relationship (x, y, z, θx, θy, θz) will be described in a case that the reference piece 36 has a spherical body. FIG. 10 is a diagram for explaining calculation of θz, FIG. 11 is a diagram for explaining a method of calculating θx and θy, and FIG. 12 is a diagram for explaining calculation of z. The control device 16 calculates θz first, then calculates θx, θy, thereafter calculates x, y, and finally calculates z.

<Calculation of θz>

As shown in FIG. 10, the robot control unit 60 moves the reference piece 36 to an arbitrary first position (position PP10) inside the machining area of the wire electrical discharge machine 12, in the $X_2Y_2Z_2$ orthogonal coordinate system. In FIG. 10, the solid line indicates the reference piece 36 moved to the position PP10. The piece position acquiring unit 62 acquires the piece position (that is, the position PP10) in the $X_2Y_2Z_2$ orthogonal coordinate system from the robot control unit 60.

Next, the electrode motion control unit 64 (first motion control unit 64a) moves the wire electrode 20 while keeping the wire electrode 20 parallel to the $Z_1$-axis such that the wire electrode 20 comes into contact with the reference piece 36 located at the position PP10, multiple times at different points on the reference piece 36.

Then, the electrode position acquiring unit 66 acquires the multiple first electrode positions of the wire electrode 20 in the $X_1Y_1Z_1$ orthogonal coordinate system when the wire electrode 20 is in contact with the reference piece 36 located at the position PP10.

Thereafter, the relative positional relationship calculator 68 calculates a center position PS1 of the spherical reference piece 36 in the $X_1Y_1Z_1$ orthogonal coordinate system, based on the multiple first electrode positions where the wire electrode 20 is in contact with the reference piece 36 located at the position PP10. The coordinates of the center position PS1 in the $X_1Y_1$ coordinate system are denoted as ($Cx_{10}$, $Cy_{10}$).

Subsequently, the robot control unit 60 moves the reference piece 36 to a second position PP11 in the $X_2Y_2Z_2$ orthogonal coordinate system. This position PP11 is located at a position displaced by a distance B from the position PP10 in the positive $X_2$-direction. In FIG. 10, the reference piece 36 moved to the position PP11 is indicated by the broken line. The piece position acquiring unit 62 acquires the piece position (that is, the position PP11) in the $X_2Y_2Z_2$ orthogonal coordinate system from the robot control unit 60. It should be noted that the first position PP10 and the second position PP11 are the same, except that the $X_2$-coordinates are different.

Next, the electrode motion control unit 64 (second motion control unit 64b) moves the wire electrode 20 while keeping the wire electrode 20 parallel to the $Z_1$-axis such that the wire electrode 20 comes into contact with the reference piece 36 located at the position PP11, multiple times at different points on the reference piece 36.

Then, the electrode position acquiring unit 66 acquires the multiple first electrode positions of the wire electrode 20 in the $X_1Y_1Z_1$ orthogonal coordinate system when the wire electrode 20 is in contact with the reference piece 36 located at the position PP11.

Thereafter, the relative positional relationship calculator 68 calculates a center position PS2 of the spherical reference piece 36 in the $X_1Y_1Z_1$ orthogonal coordinate system, based on the multiple first electrode positions where the wire electrode 20 is in contact with the reference piece 36 located at the position PP11. The coordinates of the center position PS2 in the $X_1Y_1$ coordinate system are denoted as ($Cx_{11}$, $Cy_{11}$).

Subsequently, the relative positional relationship calculator 68 calculates θz from the calculated center positions PS1, PS2 and the piece positions (position PP10, position PP11). The relative positional relationship calculator 68 calculates θz using Equation (2) as follows:

$$\tan\theta_z = \frac{Cy_{11} - Cy_{10}}{Cx_{11} - Cx_{10}} \quad (2)$$

$$\therefore \theta_z = \tan^{-1}\left(\frac{Cy_{11} - Cy_{10}}{Cx_{11} - Cx_{10}}\right)$$

After calculation of θz, the robot control unit 60 moves the reference piece 36 in the compensated $X_2Y_2Z_2$ orthogonal coordinate system, compensated by the calculated θz. That is, by compensating the $X_2Y_2Z_2$ orthogonal coordinate system using the calculated θz, the rotational shift amount θz about the $Z_1$-axis between the $X_1Y_1Z_1$ orthogonal coordinate system and the compensated $X_2Y_2Z_2$ orthogonal coordinate system is canceled to be zero.

<Calculation of θx, θy>

Since the calculation methods of θx and θy are the same, description herein will be made by giving an example of the method of calculating θy. In addition, the way of thinking in calculation of θx and θy is the same as that in the above-described embodiment.

As shown in FIG. 11, the robot control unit 60 moves the reference piece 36 to an arbitrary first position (position PP12) inside the machining area of the wire electrical discharge machine 12, in the compensated $X_2Y_2Z_2$ orthogonal coordinate system. In FIG. 11, the reference piece 36 moved to the position PP12 is indicated by the solid line. The piece position acquiring unit 62 acquires the piece position (that is, the position PP12) in the $X_2Y_2Z_2$ orthogonal coordinate system from the robot control unit 60.

Next, the electrode motion control unit 64 (first motion control unit 64a) moves the wire electrode 20 while keeping the wire electrode 20 parallel to the $Z_1$-axis such that the wire electrode 20 comes into contact with the reference piece 36 located at the position PP12, multiple times at different points on the reference piece 36.

Then, the electrode position acquiring unit 66 acquires the multiple first electrode positions of the wire electrode 20 in the $X_1Y_1Z_1$ orthogonal coordinate system when the wire electrode 20 is in contact with the reference piece 36 located at the position PP12.

Thereafter, the relative positional relationship calculator 68 calculates a center position PS3 of the spherical reference piece 36 in the $X_1Y_1Z_1$ orthogonal coordinate system, based on the multiple first electrode positions where the wire electrode 20 is in contact with the reference piece 36 located at the position PP12. The $X_1$-coordinate of the center position PS3 is denoted as $Cx_{12}$.

Subsequently, the robot control unit 60 moves the reference piece 36 to a second position PP13 in the compensated $X_2Y_2Z_2$ orthogonal coordinate system. This position PP13 is located at a position displaced by a distance C from the position PP12 in the positive $X_2$-direction. In FIG. 11, the reference piece 36 moved to the position PP13 is indicated by the broken line. The piece position acquiring unit 62 acquires the piece position (that is, the position PP13) in the $X_2Y_2Z_2$ orthogonal coordinate system from the robot control unit 60. It should be noted that the first position PP12 and the second position PP13 are the same, except that the $X_2$-coordinates are different.

Next, the electrode motion control unit 64 (second motion control unit 64b) moves the wire electrode 20 while keeping the wire electrode 20 parallel to the $Z_1$-axis such that the wire electrode 20 comes into contact with the reference piece 36 located at the position PP13, multiple times at different points on the reference piece 36.

Then, the electrode position acquiring unit 66 acquires the multiple first electrode positions of the wire electrode 20 in the $X_1Y_1Z_1$ orthogonal coordinate system when the wire electrode 20 is in contact with the reference piece 36 located at the position PP13.

Thereafter, the relative positional relationship calculator 68 calculates a center position PS4 of the spherical reference piece 36 in the $X_1Y_1Z_1$ orthogonal coordinate system, based on the multiple first electrode positions where the wire electrode 20 is in contact with the reference piece 36 located at the position PP13. The $X_1$-coordinate of the center position PS4 is denoted as $Cx_{13}$.

Subsequently, the relative positional relationship calculator 68 calculates θy from the calculated center positions PS3, PS4 and the piece positions (position PP12, position PP13). The relative positional relationship calculator 68 calculates θy using Equation (3) as below. Note that C is the distance between the position PP12 (i.e., first position) and the position PP13 (i.e., second position).

$$\cos\theta y = \frac{Cx_{13} - Cx_{12}}{C} \quad (3)$$

$$\therefore \theta y = \pm \cos^{-1}\left(\frac{Cx_{13} - Cx_{12}}{C}\right)$$

Here, θy has two solutions of the opposite sign (±), and at this point, it cannot be determined which one is appropriate. Accordingly, one of the two solutions is selected as θy, and the $X_2Y_2Z_2$ orthogonal coordinate system is further compensated with the selected θy. Then, the above operation is performed once again to calculate θy. If the absolute value of the newly calculated θy is smaller than the absolute value of the initially calculated θy, then the selected θy is adopted. If the absolute value of the newly calculated θy is greater than the absolute value of the initially calculated θy, then the solution which was not selected is adopted as θy. In this way, the value of θy can be determined.

The calculation of θx can be obtained in the same manner as the calculation of θy. That is, θx can be obtained based on the first electrode positions at which the wire electrode 20 and the reference piece 36 come in contact with each other, before and after movement of the reference piece 36 in the $Y_1$-axis direction, and the movement distance of the reference piece 36. In other words, the method of calculating θy may be applied in a state where the $X_1Y_1Z_1$ orthogonal coordinate system is rotated 90° about the $Z_1$-axis.

After the determination of θy and θx, the robot control unit 60 moves the reference piece 36 in the $X_2Y_2Z_2$ orthogonal coordinate system that was compensated based on θz, θy and θx. That is, by compensating the $X_2Y_2Z_2$ orthogonal coordinate system using the calculated θz, θy and θx, the rotational shift amount θz about the $Z_1$-axis, the rotational shift amount θy about the $Y_1$-axis, and the rotational shift amount θx about the $X_1$-axis between the $X_1Y_1Z_1$ orthogonal coordinate system and the compensated $X_2Y_2Z_2$ orthogonal coordinate system become zero.

<Calculation of x, y>

After θx, θy, and θz are calculated, the robot control unit 60 moves the reference piece 36 to an arbitrary position PP14 inside the machining area of the wire electrical discharge machine 12, in the compensated $X_2Y_2Z_2$ orthogonal coordinate system. The piece position acquiring unit 62 acquires the piece position (that is, the position PP14) in the $X_2Y_2Z_2$ orthogonal coordinate system from the robot control unit 60.

The electrode motion control unit 64 moves the wire electrode 20 while keeping the wire electrode 20 parallel to the $Z_1$-axis, such that the wire electrode 20 comes in contact with the reference piece 36 located at the position PP14, multiple times at different points on the reference piece 36.

Then, the electrode position acquiring unit 66 acquires multiple first electrode positions of the wire electrode 20 in the $X_1Y_1Z_1$ orthogonal coordinate system when the wire electrode 20 is in contact with the reference piece 36 located at the position PP14.

Thereafter, the relative positional relationship calculator 68 calculates a center position PS5 of the spherical reference piece 36 in the $X_1Y_1Z_1$ orthogonal coordinate system, based on the multiple first electrode positions where the wire electrode 20 is in contact with the reference piece 36 located at the position PP14.

Subsequently, the relative positional relationship calculator 68 calculates x, y based on the calculated center position PS5 and the piece position (position PP14).

After calculation of x and y, the robot control unit 60 moves the reference piece 36 in the $X_2Y_2Z_2$ orthogonal coordinate system that has been compensated based on the calculated θz, θy, θx, x and y. That is, by compensating the $X_2Y_2Z_2$ orthogonal coordinate system using the calculated θz, θy, θx, x and y, as to the coordinate system relative positional relationship (x, y, z, θx, θy, θz) between the $X_1Y_1Z_1$ orthogonal coordinate system and the compensated $X_2Y_2Z_2$ orthogonal coordinate system, the values of θz, θy, θx, x, and y become zero.

<Calculation of z>

The robot control unit 60 moves the reference piece 36 to a predetermined position PP15 inside the machining area of the wire electrical discharge machine 12, in the compensated $X_2Y_2Z_2$ orthogonal coordinate system. The piece position acquiring unit 62 acquires the piece position (i.e., the position PP15) in the compensated $X_2Y_2Z_2$ orthogonal coordinate system from the robot control unit 60. The position PP15 in the compensated $X_2Y_2$ coordinate system corresponds to the center position PS6 of the reference piece 36 in the $X_1Y_1$ coordinate system. The coordinates of the center position PS6 of the reference piece 36 in the $X_1Z_1$ coordinate system are denoted as (Cpx, Cpz). The value of Cpz is unknown.

As shown in FIG. 12, the electrode motion control unit 64 (the third motion control unit 64c) moves the wire electrode 20 in the negative $X_1$-axis direction while keeping the wire electrode 20 inclined a predetermined angle θw in the $X_1$-direction with respect to the $Z_1$-axis, such that the wire electrode 20 comes in contact with the reference piece 36 located at the position PP15 in the compensated $X_2Y_2Z_2$ orthogonal coordinate system, from the positive $X_1$-direction side.

Then, the electrode position acquiring unit 66 acquires the position of the wire electrode 20 in the $X_1Y_1Z_1$ orthogonal coordinate system when the wire electrode 20 is in contact with the reference piece 36. The acquired $X_1Z_1$ positional coordinates of the wire electrode 20 are denoted as (Csx, Csz). The position of the wire electrode 20 is the position of the lower wire guide 26, and the $Z_1$-coordinate value of the position of the lower wire guide 26 is known.

The relative positional relationship calculator 68 calculates z, based on the acquired $X_1$-coordinate Cpx of the position of the reference piece 36, and the $X_1Z_1$ positional coordinates (Csx, Csz) of the wire electrode 20 in the $X_1Y_1Z_1$ orthogonal coordinate system and the angle θw when the wire electrode 20 is in contact with the reference piece 36.

When the distance from the point of contact between the wire electrode 20 and the reference piece 36 to the position (Csx, Csz) is denoted as R, R can be expressed by the following equation (4).

$$R \times \cos\theta_w = Cpx - Csx + r \times \sin\theta_w \quad (4)$$
$$\therefore R = \frac{Cpx - Csx}{\cos\theta_w} + r \times \tan\theta_w$$

Further, an angle θd formed by a straight line passing through the position (Csx, Csz) and the point of contact between the wire electrode 20 and the reference piece 36, and a straight line passing through the position (Csx, Csz) and the center position PS6 of the reference piece 36 can be expressed by the following equation (5), where r denotes the radius of the reference piece 36.

$$\tan\theta_d = \frac{r}{R} \quad (5)$$
$$\therefore \theta_d = \tan^{-1}\left(\frac{r}{R}\right)$$

The $Z_1$-coordinate value Cpz of the position of the reference piece 36, that is, a shift amount z of the $X_2Y_2Z_2$ orthogonal coordinate system in the $Z_1$-axis direction with respect to the $X_1Y_1Z_1$ orthogonal coordinate system can be expressed by the following equation (6). Therefore, the relative positional relationship calculator 68 calculates the shift amount z using the Eqs. (4) to (6).

$$\tan(\theta_w + \theta_d) = \frac{Cpz - Csz}{Cpx - Csx} \quad (6)$$
$$\therefore z = Cpz = (Cpx - Csx) \times \tan(\theta_w + \theta_d) + Csz$$

Thus, the relative positional relationship calculator 68 can calculate all of x, y, z, θx, θy and θz.

<Modification 2>

In the above embodiment and Modification 1, every time at least one of the shift amounts of the coordinate system relative positional relationship (x, y, z, θx, θy, θz) is calculated, the $X_2Y_2Z_2$ orthogonal coordinate system is compensated based on the calculated one shift amount. Then the reference piece 36 is moved on the basis of the compensated $X_2Y_2Z_2$ orthogonal coordinate system, and another shift amount which has not yet been calculated is calculated. However, even when at least one of the shift amounts of the coordinate system relative positional relationship (x, y, z, θx, θy, θz) is calculated, the reference piece 36 may be moved on the basis of the originally set or uncompensated $X_2Y_2Z_2$ orthogonal coordinate system, and then the detected position of the wire electrode 20 at the time of contact may be compensated in accordance with the already calculated shift amount.

<Modification 3>

In the above embodiment and Modifications 1 and 2, the coordinate system relative positional relationship (x, y, z, θx, θy, θz) between the $X_1Y_1Z_1$ orthogonal coordinate system and the $X_2Y_2Z_2$ orthogonal coordinate system is calculated. However, the coordinate system relative positional relationship between the $X_2Y_2Z_2$ orthogonal coordinate system compensated based on the reference relative positional relationship stored in the storage unit 70 and the $X_1Y_1Z_1$ orthogonal coordinate system may be calculated. In this case, the reference relative positional relationship stored in the storage unit 70 may be compensated based on the calculated coordinate system relative positional relationship.

<Modification 4>

In the above-described embodiment and Modifications 1 to 3, the robot 14 is used as a moving device for moving the workpiece W in order to exchange the workpiece W placed on the table 22. However, a workpiece changer, instead of the robot 14, may be used.

<Modification 5>

In the above embodiment and Modifications 1 to 4, the reference piece 36 is gripped by the hand 30. However, the reference piece 36 may be attached to the robot 14. For example, the shape of the distal end of the arm 14b may be used as the reference piece 36. In short, any reference piece 36 may be used as long as it has a known shape.

<Modification 6>

In the above embodiment and Modifications 1 to 5, the wire electrical discharge machine 12 and the robot 14 are controlled by a single control device 16. However, the wire electrical discharge machine 12 and the robot 14 may be controlled respectively by separate control devices 16. In this case, the control device for controlling the wire electrical discharge machine 12 and the control device for controlling the robot 14 should be configured to communicate with each other.

[Technical Concept Obtained from Embodiments]

The technical concept that can be grasped from each of the embodiments (including Modifications) will be described below.

<First Technical Concept>

The wire electrical discharge machining system (10) includes the wire electrical discharge machine (12) configured to perform electrical discharge machining on a workpiece (W) while feeding the wire electrode (20) and changing a relative position between the wire electrode (20) and a table (22) supporting the workpiece (W), and a moving device (14) configured to move the workpiece (W) in order to exchange the workpiece (W) placed on the wire electrical discharge machine (12). The wire electrical discharge machine (12) operates on the basis of a preset $X_1Y_1Z_1$ orthogonal coordinate system. The moving device (14) operates on the basis of a preset $X_2Y_2Z_2$ orthogonal coordinate system. The moving device (14) includes the reference piece (36) having a predetermined shape and configured to serve as a reference for positional information, and the piece driving mechanism (14b) configured to move the reference piece (36). The wire electrical discharge machine (12) includes the electrode driving mechanism (52) configured to move the wire electrode (20) along a plane parallel to the $X_1Y_1$-plane with which a feed direction of the wire electrode (20) intersects, and tilt the wire electrode (20) with respect to the $Z_1$-axis, and the contact detector (28) configured to detect whether the reference piece (36) has come in contact with the wire electrode (20). The wire electrical discharge machining system (10) further includes: the electrode motion control unit (64) configured to control the electrode driving mechanism (52) so as to move the wire electrode (20) while keeping the wire electrode (20) parallel to the $Z_1$-axis and bring the wire electrode (20) into contact with the reference piece (36) and so as to move the wire electrode (20) while keeping the wire electrode (20) inclined with respect to the $Z_1$-axis and bring the wire electrode (20) into contact with the reference piece (36); the electrode position acquiring unit (66) configured to acquire a first electrode position of the wire electrode (20) in the $X_1Y_1Z_1$ orthogonal coordinate system when the wire electrode (20) in a state of being parallel to the $Z_1$-axis comes in contact with the reference piece (36), and a second electrode position of the wire electrode (20) in the $X_1Y_1Z_1$ orthogonal coordinate system when the wire electrode (20) in a state of being inclined with respect to the $Z_1$-axis comes in contact with the reference piece (36); the piece position acquiring unit (62) configured to acquire the piece position of the reference piece (36) in the $X_2Y_2Z_2$ orthogonal coordinate system when the wire electrode (20) comes in contact with the reference piece (36); and the relative positional relationship calculator (68) configured to calculate a coordinate system relative positional relationship between the $X_1Y_1Z_1$ orthogonal coordinate system and the $X_2Y_2Z_2$ orthogonal coordinate system, based on the first electrode position, the second electrode position, and the piece position.

Thus, without using an imaging device, a probe or the like, it is possible to calculate the relative positional relationship between the coordinate system of the wire electrical discharge machine (12) and the coordinate system of the moving device (14) for moving the workpiece (W) of the wire electrical discharge machine (12). In addition, since none of imaging devices, probes and the like is used, the cost of the wire electrical discharge machining system (10) can be reduced.

The electrode motion control unit (64) may include: the first motion control unit (64a) configured to control the electrode driving mechanism (52) so as to move the wire electrode (20) while keeping the wire electrode (20) parallel to the $Z_1$-axis so that the wire electrode (20) comes into contact with the reference piece (36) located at a first position in the $X_2Y_2Z_2$ orthogonal coordinate system; the second motion control unit (64b) configured to control the electrode driving mechanism (52) so as to move the wire electrode (20) while keeping the wire electrode (20) parallel to the $Z_1$-axis so that the wire electrode (20) comes into contact with the reference piece (36) located at a second position, which is different from the first position, in the $X_2Y_2Z_2$ orthogonal coordinate system; and the third motion control unit (64c) configured to control the electrode driving mechanism (52) so as to move the wire electrode (20) while keeping the wire electrode (20) inclined with respect to the $Z_1$-axis so that the wire electrode (20) comes into contact with the reference piece (36) located at a predetermined position in the $X_2Y_2Z_2$ orthogonal coordinate system.

This makes it possible to accurately and easily calculate the coordinate system relative positional relationship between the coordinate system of the wire electrical discharge machine (12) and the coordinate system of the moving device (14) for moving the workpiece (W) of the wire electrical discharge machine (12).

The first position and the second position may have the same coordinate in the $Z_2$-axis.

This makes it possible to accurately and easily calculate the coordinate system relative positional relationship between the coordinate system of the wire electrical discharge machine (12) and that of the moving device (14) for moving the workpiece (W) of the wire electrical discharge machine (12).

The moving device (14) may be an articulated robot, and the reference piece (36) may be gripped by or attached to the articulated robot (14).

As a result, the workpiece (W) can be exchanged easily.

The wire electrical discharge machining system (10) may further include: the storage unit (70) in which a reference relative positional relationship between the $X_1Y_1Z_1$ orthogonal coordinate system and the $X_2Y_2Z_2$ orthogonal coordinate system is stored in advance; the comparison and determination unit (72) configured to compare the reference relative positional relationship stored in the storage unit (70) with the coordinate system relative positional relationship calculated by the relative positional relationship calculator (68), and determine whether or not the difference falls within an allowable range; and the warning unit (74) configured to warn the operator if the difference falls outside the allowable range, the prohibiting unit (76) configured to prohibit operations of the wire electrical discharge machine (12) and the moving device (14) if the difference falls outside the allowable range, or the operating condition changing unit (78) configured to change operating conditions of the wire electrical discharge machine (12) and the moving device (14) if the difference falls outside the allowable range.

Thereby, it is possible to prevent the wire electrical discharge machine (12) and the robot (14) from colliding with each other.

<Second Technical Concept>

The relative positional relationship calculating method calculates a coordinate system relative positional relationship between an $X_1Y_1Z_1$ orthogonal coordinate system preset in a wire electrical discharge machine (12) and an $X_2Y_2Z_2$ orthogonal coordinate system preset in a moving device (14). The moving device (14) moves a workpiece (W) in order to exchange the workpiece (W) placed on the wire electrical discharge machine (12), operates on the basis of the preset $X_2Y_2Z_2$ orthogonal coordinate system, and includes the reference piece (36) having a predetermined shape and serving as a reference for positional information, and the piece driving mechanism (14b) configured to move the reference piece (36). The wire electrical discharge machine (12) performs electrical discharge machining on the workpiece (W) while feeding a wire electrode (20) and changing the relative position between the wire electrode (20) and a table (22) supporting the workpiece (W), and operates on the basis of the preset $X_1Y_1Z_1$ orthogonal coordinate system. The wire electrical discharging machine includes the electrode driving mechanism (52) configured to move the wire electrode (20) along a plane parallel to the $X_1Y_1$-plane with which a feed direction of the wire electrode (20) intersects, and tilt the wire electrode (20) with respect to the $Z_1$-axis, and the contact detector (28) configured to detect whether the reference piece (36) has come in contact with the wire electrode (20). The relative positional relationship calculating method includes: an electrode motion controlling step of controlling the electrode driving mechanism (52) so as to move the wire electrode (20) while keeping the wire electrode (20) parallel to the $Z_1$-axis and bring the wire electrode (20) into contact with the reference piece (36) and so as to move the wire electrode (20) while keeping the wire electrode (20) inclined with respect to the $Z_1$-axis and bring the wire electrode (20) into contact with the reference piece (36); an electrode position acquiring step of acquiring a first electrode position of the wire electrode (20) in the $X_1Y_1Z_1$ orthogonal coordinate system when the wire electrode in a state of being parallel to the $Z_1$-axis comes in contact with the reference piece (36), and a second electrode position of the wire electrode (20) in the $X_1Y_1Z_1$ orthogonal coordinate system when the wire electrode (20) in a state of being inclined with respect to the $Z_1$-axis comes in contact with the reference piece (36); a piece position acquiring step of acquiring the piece position of the reference piece (36) in the $X_2Y_2Z_2$ orthogonal coordinate system when the wire electrode (20) comes in contact with the reference piece (36); and a relative positional relationship calculating step of calculating the coordinate system relative positional relationship between the $X_1Y_1Z_1$ orthogonal coordinate system and the $X_2Y_2Z_2$ orthogonal coordinate system, based on the first electrode position, the second electrode position, and the piece position.

Thus, without using an imaging device, a probe or the like, it is possible to calculate the relative positional relationship between the coordinate system of the wire electrical discharge machine (12) and the coordinate system of the moving device (14) for moving the workpiece (W) of the wire electrical discharge machine (12). In addition, since none of imaging devices, probes and the like is used, the cost of the wire electrical discharge machining system (10) can be reduced.

The electrode motion controlling step may include: a first motion controlling step of controlling the electrode driving mechanism (52) so as to move the wire electrode (20) while keeping the wire electrode (20) parallel to the $Z_1$-axis so that the wire electrode (20) comes into contact with the reference piece (36) located at a first position in the $X_2Y_2Z_2$ orthogonal coordinate system; a second motion controlling step of controlling the electrode driving mechanism (52) so as to move the wire electrode (20) while keeping the wire electrode (20) parallel to the $Z_1$-axis so that the wire electrode (20) comes into contact with the reference piece (36) located at a second position, which is different from the first position, in the $X_2Y_2Z_2$ orthogonal coordinate system; and a third motion controlling step of controlling the electrode driving mechanism (52) so as to move the wire electrode (20) while keeping the wire electrode (20) inclined with respect to the $Z_1$-axis so that the wire electrode (20) comes into contact with the reference piece (36) located at a predetermined position in the $X_2Y_2Z_2$ orthogonal coordinate system.

This makes it possible to accurately and easily calculate the coordinate system relative positional relationship between the coordinate system of the wire electrical discharge machine (12) and the coordinate system of the moving device (14) for moving the workpiece (W) of the wire electrical discharge machine (12).

The first position and the second position may have the same coordinate in the $Z_2$-axis.

This makes it possible to accurately and easily calculate the coordinate system relative positional relationship between the coordinate system of the wire electrical discharge machine (12) and that of the moving device (14) for moving the workpiece (W) of the wire electrical discharge machine (12).

The moving device (14) may be an articulated robot, and the reference piece (36) may be gripped by or attached to the articulated robot (14).

As a result, the workpiece (W) can be replaced easily.

The relative positional relationship calculating method may further include: a storing step of storing in advance, in the storage unit (70), a reference relative positional relationship between the $X_1Y_1Z_1$ orthogonal coordinate system and the $X_2Y_2Z_2$ orthogonal coordinate system; a comparing and determining step of comparing the reference relative positional relationship stored in the storage unit (70) with the coordinate system relative positional relationship calculated in the relative positional relationship calculating step, and determining whether or not the difference falls within an allowable range; and a warning step of warning the operator if the difference falls outside the allowable range, a prohibiting step of prohibiting operations of the wire electrical discharge machine (12) and the moving device (14) if the difference falls outside the allowable range, or an operating condition changing step of changing operating conditions of the wire electrical discharge machine (12) and the moving device (14) if the difference falls outside the allowable range.

Thereby, it is possible to prevent the wire electrical discharge machine (12) and the robot (14) from colliding with each other.

While the invention has been particularly shown and described with reference to the preferred embodiments, it will be understood that variations and modifications can be effected thereto by those skilled in the art without departing from the scope of the invention as defined by the appended claims.

What is claimed is:

1. A wire electrical discharge machining system comprising:
   a wire electrical discharge machine configured to perform electrical discharge machining on a workpiece while feeding a wire electrode and changing a relative position between the wire electrode and a table supporting the workpiece, and also configured to operate based on a preset $X_1Y_1Z_1$ orthogonal coordinate system;
   a moving device configured to move the workpiece in order to exchange the workpiece placed on the wire electrical discharge machine, and also configured to operate based on a preset $X_2Y_2Z_2$ orthogonal coordinate system;
   wherein the moving device includes a reference piece having a predetermined shape and configured to serve as a reference for positional information, and a piece driving mechanism configured to move the reference piece, and
   the wire electrical discharge machine includes an electrode driving mechanism configured to move the wire electrode along a plane parallel to an $X_1Y_1$-plane located in the preset $X_1Y_1Z_1$ orthogonal coordinate system with which a feed direction of the wire electrode intersects, and tilt the wire electrode with respect to $Z_1$-axis located in the preset $X_1Y_1Z_1$ orthogonal coordinate system, and a contact detector configured to detect whether the reference piece has come in contact with the wire electrode,
   the wire electrical discharge machining system further comprising:
   an electrode motion control unit configured to control the electrode driving mechanism so as to move the wire electrode while keeping the wire electrode parallel to the $Z_1$-axis located in the preset $X_1Y_1Z_1$ orthogonal coordinate system, and bring the wire electrode into contact with the reference piece and so as to move the wire electrode while keeping the wire electrode inclined with respect to the $Z_1$-axis located in the preset $X_1Y_1Z_1$ orthogonal coordinate system, and bring the wire electrode into contact with the reference piece;
   an electrode position acquiring unit configured to acquire a first electrode position of the wire electrode in the preset $X_1Y_1Z_1$ orthogonal coordinate system when the wire electrode in a state of being parallel to the $Z_1$-axis comes in contact with the reference piece, and a second electrode position of the wire electrode in the preset $X_1Y_1Z_1$ orthogonal coordinate system when the wire electrode in a state of being inclined with respect to the $Z_1$-axis comes in contact with the reference piece;
   a piece position acquiring unit configured to acquire a piece position of the reference piece in the preset $X_2Y_2Z_2$ orthogonal coordinate system when the wire electrode comes in contact with the reference piece; and
   a relative positional relationship calculator configured to calculate a coordinate system relative positional relationship between the preset $X_1Y_1Z_1$ orthogonal coordinate system and the preset $X_2Y_2Z_2$ orthogonal coordinate system, based on the first electrode position, the second electrode position, and the piece position.

2. The wire electrical discharge machining system according to claim 1, wherein:
   the electrode motion control unit includes:
   a first motion control unit configured to control the electrode driving mechanism so as to move the wire electrode while keeping the wire electrode parallel to the $Z_1$-axis so that the wire electrode comes in contact with the reference piece located at a first position in the preset $X_2Y_2Z_2$ orthogonal coordinate system;
   a second motion control unit configured to control the electrode driving mechanism so as to move the wire electrode while keeping the wire electrode parallel to the $Z_1$-axis located in the preset $X_1Y_1Z_1$ orthogonal coordinate system so that the wire electrode comes in contact with the reference piece located at a second position, which is different from the first position, in the preset $X_2Y_2Z_2$ orthogonal coordinate system; and
   a third motion control unit configured to control the electrode driving mechanism so as to move the wire electrode while keeping the wire electrode inclined with respect to the $Z_1$-axis located in the preset $X_1Y_1Z_1$ orthogonal coordinate system so that the wire electrode comes in contact with the reference piece located at a predetermined position in the preset $X_2Y_2Z_2$ orthogonal coordinate system.

3. The wire electrical discharge machining system according to claim 2, wherein the first position and the second position have a same coordinate in the $Z_2$-axis located in the preset $X_2Y_2Z_2$ orthogonal coordinate system.

4. The wire electrical discharge machining system according to claim 1, wherein:
   the moving device is an articulated robot; and
   the reference piece is gripped by or attached to the articulated robot.

5. The wire electrical discharge machining system according to claim 1, further comprising:
- a storage unit in which a reference relative positional relationship between the preset $X_1Y_1Z_1$ orthogonal coordinate system and the preset $X_2Y_2Z_2$ orthogonal coordinate system is stored in advance;
- a comparison and determination unit configured to compare the reference relative positional relationship stored in the storage unit with the coordinate system relative positional relationship calculated by the relative positional relationship calculator, and determine whether or not a difference between the reference relative positional relationship and the calculated coordinate system relative positional relationship falls within an allowable range; and
- a warning unit configured to warn an operator if the difference falls outside the allowable range, a prohibiting unit configured to prohibit operations of the wire electrical discharge machine and the moving device if the difference falls outside the allowable range, or an operating condition changing unit configured to change operating conditions of the wire electrical discharge machine and the moving device if the difference falls outside the allowable range.

6. A relative positional relationship calculating method for calculating a coordinate system relative positional relationship between an $X_1Y_1Z_1$ orthogonal coordinate system preset in a wire electrical discharge machine and an $X_2Y_2Z_2$ orthogonal coordinate system preset in a moving device, wherein:
- the moving device moves a workpiece in order to exchange the workpiece placed on the wire electrical discharge machine, and operates based on the preset $X_2Y_2Z_2$ orthogonal coordinate system,
- the moving device includes:
- a reference piece having a predetermined shape and configured to serve as a reference for positional information; and
- a piece driving mechanism configured to move the reference piece,
- the wire electrical discharge machine performs electrical discharge machining on the workpiece while feeding a wire electrode and changing a relative position between the wire electrode and a table supporting the workpiece, and operates based on the preset $X_1Y_1Z_1$ orthogonal coordinate system, and
- the wire electrical discharge machine includes:
- an electrode driving mechanism configured to move the wire electrode along a plane parallel to an $X_1Y_1$-plane located in the preset $X_1Y_1Z_1$ orthogonal coordinate system with which a feed direction of the wire electrode intersects, and tilt the wire electrode with respect to $Z_1$-axis located in the preset $X_1Y_1Z_1$ orthogonal coordinate system; and
- a contact detector configured to detect whether the reference piece has come in contact with the wire electrode,
- the relative positional relationship calculating method comprising:
- an electrode motion controlling step of controlling the electrode driving mechanism so as to move the wire electrode while keeping the wire electrode parallel to the $Z_1$-axis located in the preset $X_1Y_1Z_1$ orthogonal coordinate system and bring the wire electrode into contact with the reference piece and so as to move the wire electrode while keeping the wire electrode inclined with respect to the $Z_1$-axis located in the preset $X_1Y_1Z_1$ orthogonal coordinate system and bring the wire electrode into contact with the reference piece;
- an electrode position acquiring step of acquiring a first electrode position of the wire electrode in the preset $X_1Y_1Z_1$ orthogonal coordinate system when the wire electrode in a state of being parallel to the $Z_1$-axis located in the preset $X_1Y_1Z_1$ orthogonal coordinate system comes in contact with the reference piece, and a second electrode position of the wire electrode in the preset $X_1Y_1Z_1$ orthogonal coordinate system when the wire electrode in a state of being inclined with respect to the $Z_1$-axis located in the preset $X_1Y_1Z_1$ orthogonal coordinate system comes in contact with the reference piece;
- a piece position acquiring step of acquiring a piece position of the reference piece in the preset $X_2Y_2Z_2$ orthogonal coordinate system when the wire electrode comes in contact with the reference piece; and
- a relative positional relationship calculating step of calculating the coordinate system relative positional relationship between the preset $X_1Y_1Z_1$ orthogonal coordinate system and the preset $X_2Y_2Z_2$ orthogonal coordinate system, based on the first electrode position, the second electrode position, and the piece position.

7. The relative positional relationship calculating method according to claim 6, wherein the electrode motion controlling step includes:
- a first motion controlling step of controlling the electrode driving mechanism so as to move the wire electrode while keeping the wire electrode parallel to the $Z_1$-axis located in the preset $X_1Y_1Z_1$ orthogonal coordinate system so that the wire electrode comes in contact with the reference piece located at a first position in the preset $X_2Y_2Z_2$ orthogonal coordinate system;
- a second motion controlling step of controlling the electrode driving mechanism so as to move the wire electrode while keeping the wire electrode parallel to the $Z_1$-axis located in the preset $X_1Y_1Z_1$ orthogonal coordinate system so that the wire electrode comes in contact with the reference piece located at a second position, which is different from the first position, in the preset $X_2Y_2Z_2$ orthogonal coordinate system; and
- a third motion controlling step of controlling the electrode driving mechanism so as to move the wire electrode while keeping the wire electrode inclined with respect to the $Z_1$-axis located in the preset $X_1Y_1Z_1$ orthogonal coordinate system so that the wire electrode comes in contact with the reference piece located at a predetermined position in the preset $X_2Y_2Z_2$ orthogonal coordinate system.

8. The relative positional relationship calculating method according to claim 7, wherein the first position and the second position have a same coordinate in $Z_2$-axis located in the preset $X_2Y_2Z_2$ orthogonal coordinate system.

9. The relative positional relationship calculating method according to claim 6, wherein:
- the moving device is an articulated robot; and
- the reference piece is gripped by or attached to the articulated robot.

10. The relative positional relationship calculating method according to claim 6, further comprising:
- a storing step of storing in advance, in a storage unit, a reference relative positional relationship between the preset $X_1Y_1Z_1$ orthogonal coordinate system and the preset $X_2Y_2Z_2$ orthogonal coordinate system;

a comparing and determining step of comparing the reference relative positional relationship stored in the storage unit with the coordinate system relative positional relationship calculated in the relative positional relationship calculating step, and determining whether or not a difference between the reference relative positional relationship and the calculated coordinate system relative positional relationship falls within an allowable range; and a warning step of warning an operator if the difference falls outside the allowable range, a prohibiting step of prohibiting operations of the wire electrical discharge machine and the moving device if the difference falls outside the allowable range, or an operating condition changing step of changing operating conditions of the wire electrical discharge machine and the moving device if the difference falls outside the allowable range.

\* \* \* \* \*